(12) United States Patent
Kimura et al.

(10) Patent No.: US 7,776,403 B2
(45) Date of Patent: Aug. 17, 2010

(54) METHOD FOR PRODUCING ORGANIC THIN FILM

(75) Inventors: Nobuo Kimura, Naka-gun (JP);
Yoshitaka Fujita, Ichihara (JP);
Norifumi Nakamoto, Ichikawa (JP);
Tomoya Hidaka, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 10/553,109

(22) PCT Filed: Apr. 14, 2004

(86) PCT No.: PCT/JP2004/005285

§ 371 (c)(1),
(2), (4) Date: Mar. 13, 2006

(87) PCT Pub. No.: WO2004/091810

PCT Pub. Date: Oct. 28, 2004

(65) Prior Publication Data

US 2006/0188657 A1 Aug. 24, 2006

(30) Foreign Application Priority Data

| Apr. 15, 2003 | (JP) | 2003-109719 |
| Apr. 15, 2003 | (JP) | 2003-109835 |
| Sep. 12, 2003 | (JP) | 2003-321893 |
| Sep. 16, 2003 | (JP) | 2003-323173 |
| Mar. 3, 2004 | (JP) | 2004-058778 |
| Apr. 1, 2004 | (JP) | 2004-108732 |

(51) Int. Cl.
B05D 1/00 (2006.01)
B05D 1/02 (2006.01)
B05D 1/18 (2006.01)
B05D 1/28 (2006.01)
B05D 7/24 (2006.01)
C08J 7/06 (2006.01)
C03C 17/30 (2006.01)

(52) U.S. Cl. ............ 427/407.1; 427/240; 427/421.1; 427/428.01; 427/429; 427/430.1

(58) Field of Classification Search .......... 427/407.1, 427/430.1, 240, 428.01, 429, 421.1; 528/9–43
See application file for complete search history.

(56) References Cited

U.S. PATENT DOCUMENTS

| 5,580,605 A | 12/1996 | Ogawa et al. |
| 5,593,497 A | 1/1997 | Matsuyama et al. |
| 5,635,246 A | 6/1997 | Ogawa et al. |
| 5,907,013 A | 5/1999 | Ogawa |
| 2001/0019773 A1* | 9/2001 | Akamatsu et al. ........... 428/429 |

FOREIGN PATENT DOCUMENTS

| EP | 0972640 | 1/2000 |
| EP | 1484105 | 12/2004 |
| JP | 4-132637 A | 5/1992 |
| JP | 4-221630 A | 8/1992 |
| JP | 4-367721 A | 12/1992 |
| JP | 8-337654 A | 12/1996 |
| JP | 9-208438 A | 8/1997 |
| JP | 11-147074 A | 6/1999 |
| JP | 11-228942 A | 8/1999 |
| JP | 11-322368 A | 11/1999 |
| JP | 2000-053421 A | 2/2000 |
| JP | 2003-27001 A | 1/2003 |

OTHER PUBLICATIONS

"Critical Stability Constants", Martell et al., vol. 1: Amino Acids, 1974 Plenum Press, New York.
"Critical Stability Constants", Martell et al., vol. 2: Amines, 1975 Plenum Press, New York.
"Critical Stability Constants", Martell et al., vol. 3: Other Organic Ligands, 1977 Plenum Press, New York.
"Clinical Stability Constants", Martell et al., vol. 5: First Supplement, 1982 Plenum Press, New York.
International Search Report for PCT/JP2004/005285 mailed Aug. 10, 2004.
"Novel Method to Prepare Organosilane Monolayers on Solid Substrate" by Kojio et al., 2001 The Chemical Society of Japan, Bull. Chem. Soc. Jpn., 74, pp. 1397-1401 (2001).

* cited by examiner

*Primary Examiner*—William Phillip Fletcher, III
(74) *Attorney, Agent, or Firm*—Oliff & Berridge, PLC

(57) ABSTRACT

An object of the present invention is to provide a method for producing an organic thin film, which enables rapid film formation, and enables a dense organic thin film with minimal impurities to be formed stably, and in a plurality of consecutive repetitions.

The present invention provides a method for producing an organic thin film in which an organic thin film is formed on the surface of a substrate, including a step (A) of bringing the substrate into contact with an organic solvent solution containing a metal-based surfactant having at least one hydrolyzable group, and a catalyst capable of interacting with the metal-based surfactant, wherein the water content within the organic solvent solution is either set or maintained within a predetermined range.

18 Claims, 3 Drawing Sheets

METHOD FOR PRODUCING ORGANIC THIN FILM

CROSS-REFERENCE TO PRIOR APPLICATION

This is a U.S. National Phase application under 35U.S.C. §371 of International Patent Application No. PCT/JP2004/005285 filed Apr. 14, 2004, and claims the benefit of Japanese Patent Application Nos. 2003-109835 filed Apr. 15, 2003; 2003-109719 filed Apr. 15, 2003; 2003-321893 filed Sept. 12, 2003; 2003-323173 filed Sept. 16, 2003; 2004-058778 filed Mar. 3, 2004 and 2004-108732 filed Apr. 1, 2004, all of which are incorporated by reference herein. The International Application was published in Japanese on Oct. 28, 2004 as WO 2004/091810 A1 under PCT Article 21(2).

TECHNICAL FIELD

The present invention relates to a method for producing an organic thin film that is formed on the surface of a substrate via metal-oxygen bonds, an organic thin film forming solution used in the method, and an organic thin film produced using the method.

BACKGROUND ART

A number of methods for producing chemically adsorbed films that exhibit excellent resistance to peeling, a high level of transparency, and do not impair the gloss of the substrate surface or the substrate transparency are already known as suitable methods for forming a coating film that improves the properties of a substrate surface (see Japanese Unexamined Patent Application, First Publication No. Hei 4-132637, Japanese Unexamined Patent Application, First Publication No. Hei 4-221630, and Japanese Unexamined Patent Application, First Publication No. Hei 4-367721).

As a method for forming a chemically adsorbed film on a substrate surface that contains active hydrogen, a method is known in which a mixed solution containing at least an alkoxysilane-based surfactant, a non-aqueous solvent with no active hydrogen, and at least one silanol condensation catalyst selected from a group consisting of carboxylic acid metal salts, carboxylate metal salts, carboxylic acid metal salt polymers, carboxylic acid metal salt chelates, titanate esters, and titanate ester chelates is brought into contact with a substrate surface, thereby forming a chemically adsorbed film that is covalently bonded to the substrate surface via siloxane bonds (see Japanese Unexamined Patent Application, First Publication No. Hei 8-337654).

As a method for forming a chemically adsorbed film that exhibits crystallinity on a substrate surface, a method is known in which an organic solvent solution of a silane-based surfactant is developed on the surface of a silicon wafer onto which purified water has been dripped, thereby forming a crystalline monomolecular film (see Bull. Chem. Soc. Jpn., 74, 1397 to 1401 (2001)).

Methods for forming water repellent films are also known in which, by using the monomer or polymer of a hydrolysis product of a fluoroalkyl group-containing silane compound, produced by hydrolysis in the presence of an acid catalyst, a water repellent film formed from a monomolecular layer of the hydrolysis product is fixed to the substrate surface via silanol groups (see Japanese Unexamined Patent Application, First Publication No. Hei 11-228942, Japanese Unexamined Patent Application, First Publication No. Hei 11-322368).

As a method for forming a monomolecular film on a substrate surface that contains active hydrogen, a method for producing a chemically adsorbed monomolecular film is known which includes the steps of coating the surface of a substrate, in a dry atmosphere, with a chemical adsorption solution prepared using a non-aqueous organic solvent and a silane-based surfactant, chemically reacting the surfactant molecules within the adsorption solution with the surface of the substrate while the organic solvent is concentrated by evaporation, thereby bonding and fixing one end of the surfactant molecules to the substrate surface, and then using an organic solvent to wash and remove any unreacted surfactant left on the substrate surface following evaporation of the organic solvent (see Japanese Unexamined Patent Application, First Publication No. Hei 11-147074).

However, a number of problems arise in all of the methods described above, including the lengthy time required to form the film, the fact that residual silanol condensation catalyst remains in the film, inhibiting the chemical adsorption and preventing formation of a dense monomolecular film, the fact that acidic materials are generated, meaning there are restrictions on the type of substrate that can be used, and the fact that film formation must be conducted in a non-aqueous system. The stable provision of dense monomolecular films with minimal impurities is keenly sought, particularly for micropatterning in the design of electronic devices and the like. Furthermore, using the conventional methods described above, no examples are known of the formation of a crystalline chemically adsorbed film on the surface of an amorphous substrate.

DISCLOSURE OF INVENTION

The present invention takes the above circumstances associated with the conventional technology into consideration, with an object of providing a method for producing an organic thin film which enables rapid film formation, and enables a dense organic thin film with minimal impurities to be formed stably, and in a plurality of consecutive repetitions.

As a result of intensive investigation aimed at achieving the above object, the inventors of the present invention discovered that by bringing a substrate into contact with either an organic solvent solution containing a metal-based surfactant having at least one hydrolyzable group and a catalyst capable of interacting with the metal-based surfactant, wherein the water content within the solution is either set or maintained within a predetermined range, or an organic solvent solution containing a metal-based surfactant having at least one hydroxyl group, wherein the water content within the solution is either set or maintained within a predetermined range, homogenous organic thin films could be formed stably and rapidly by two or more repetitions of the film formation process using the same solution.

In other words, the present invention includes the following aspects.

(1) A method for producing an organic thin film in which an organic thin film is formed on the surface of a substrate, including a step (A) of bringing the substrate into contact with an organic solvent solution containing a metal-based surfactant having at least one hydrolyzable group, and a catalyst capable of interacting with the metal-based surfactant, wherein the water content within the organic solvent solution is either set or maintained within a predetermined range (2) A method for producing an organic thin film according to the aspect (1) above, wherein the organic solvent solution is prepared by using from 0.001 to 1 mol, or an oxide-equivalent quantity of 0.001 to 1 mol, of the catalyst capable of interacting with the metal-based surfactant per 1 mol of the metal-based surfactant.

(3) A method for producing an organic thin film in which an organic thin film is formed on the surface of a substrate, including a step (A) of bringing the substrate into contact with an organic solvent solution containing a metal-based surfactant having at least one hydrolyzable group, and a catalyst capable of interacting with the metal-based surfactant, wherein the water content within the organic solvent solution is maintained within a predetermined range, and the step (A) is repeated at least two times using the same solution.

(4) A method for producing an organic thin film according to the aspect (3) above, wherein in repeating the step (A) two or more times, the step (A) is conducted with two or more substrates using the same solution.

(5) A method for producing an organic thin film according to any one of aspects (1) to (4) above, further including a step (B) of washing the substrate following the step (A).

(6) A method for producing an organic thin film according to any one of the aspects (1) to (5) above, further including a step (C) of heating the substrate following the step (A).

(7) A method for producing an organic thin film according to aspect (6) above, further including a step (B) of washing the substrate following the step (A), but prior to the step (C).

(8) A method for producing an organic thin film according to any one of the aspects (1) to (7) above, wherein by providing a water layer that contacts the organic solvent solution, the water content within the organic solvent solution is either set or maintained within a predetermined range.

(9) A method for producing an organic thin film according to any one of the aspects (1) to (8) above, wherein by incorporating a water-retentive material in a hydrated state within the organic solvent solution, the water content within the organic solvent solution is either set or maintained within a predetermined range.

(10) A method for producing an organic thin film according to the aspect (9) above, wherein the water-retentive material is a glass fiber filter.

(11) A method for producing an organic thin film according to any one of the aspects (1) to (10) above, wherein by blowing a gas containing moisture through the organic solvent solution, the water content within the organic solvent solution is either set or maintained within a predetermined range.

(12) A method for producing an organic thin film according to any one of the aspects (1) to (11) above, wherein the water content within the organic solvent solution is either set or maintained within a range from 50 to 1,000 ppm.

(13) A method for producing an organic thin film according to any one of the aspects (1) to (12) above, wherein the water content within the predetermined range is the measured value, obtained by a Karl Fischer method, for a solution aliquot sampled from the organic solvent solution.

(14) A method for producing an organic thin film according to any one of the aspects (1) to (13) above, wherein the catalyst capable of interacting with the metal-based surfactant is at least one material selected from a group consisting of metal oxides; metal hydroxides; metal alkoxides; chelated or coordinated metal compounds; partial hydrolysis products of metal alkoxides; hydrolysis products obtained by treating a metal alkoxide with a two-fold or greater equivalence of water; organic acids; silanol condensation catalysts; and acid catalysts.

(15) A method for producing an organic thin film according to the aspect (14) above, wherein a compound with a pKa value within a range from 1 to 6 is used as the organic acid.

(16) A method for producing an organic thin film according to the aspect (14) above, wherein the partial hydrolysis product of a metal alkoxide is able to be stably dispersed in an organic solvent without aggregating, even in the absence of acids, bases, and/or dispersion stabilizers.

(17) A method for producing an organic thin film according to either the aspect (14) or the aspect (16), wherein the partial hydrolysis product of a metal alkoxide is a product obtained by hydrolyzing the metal alkoxide in an organic solvent, using from 0.5 to less than 2.0 mols of water per 1 mol of the metal alkoxide, at a temperature within a range from −100° C. to the reflux temperature of the organic solvent.

(18) A method for producing an organic thin film according to any one of the aspects (14) to (17) above, wherein the metal within the metal oxide; metal hydroxide; metal alkoxide; chelated or coordinated metal compound; partial hydrolysis product of a metal alkoxide; or hydrolysis product obtained by treating a metal alkoxide with a two-fold or greater equivalence of water is one or more metals selected from a group consisting of titanium, zirconium, aluminum, silicon, germanium, indium, tin, tantalum, zinc, tungsten, and lead.

(19) A method for producing an organic thin film according to any one of the aspects (1) to (18) above, wherein the metal-based surfactant having at least one hydrolyzable group is a compound represented by a formula (I) shown below:

$$R^1{}_n MX_{m-n} \quad (I)$$

(wherein, $R^1$ represents a hydrocarbon group that may contain a substituent, a halogenated hydrocarbon group that may contain a substituent, a hydrocarbon group containing a linkage group, or a halogenated hydrocarbon group containing a linkage group, M represents at least one metal atom selected from a group consisting of a silicon atom, germanium atom, tin atom, titanium atom, and zirconium atom, X represents a hydroxyl group or a hydrolyzable group, n represents an integer from 1 to (m−1), m represents the atomic valence of the metal M, and in those cases where n is 2 or greater, the $R^1$ groups may be the same or different, and in those cases where (m−n) is 2 or greater, the X groups may be the same or different, although of the (m−n) X groups, at least one X group must be a hydrolyzable group).

(20) A method for producing an organic thin film according to any one of the aspects (1) to (18) above, wherein the metal-based surfactant having at least one hydrolyzable group is a compound represented by a formula (II) shown below:

$$R^2{}_3C-(CR^3{}_2)_p-R^4{}_q-MY_rX_{m-r-1} \quad (II)$$

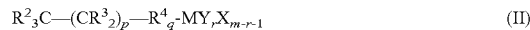

(wherein, M represents at least one metal atom selected from a group consisting of a silicon atom, germanium atom, tin atom, titanium atom, and zirconium atom, X represents a hydroxyl group or a hydrolyzable group, $R^2$ and $R^3$ each represent, independently, a hydrogen atom or a fluorine atom, $R^4$ represents an alkylene group, vinylene group, ethynylene group, arylene group, or a bivalent linkage group that contains a silicon atom and/or an oxygen atom, Y represents a hydrogen atom, or an alkyl group, alkoxy group, fluorine-containing alkyl group, or fluorine-containing alkoxy group, p represents either 0 or a natural number, q represents either 0 or 1, r represents an integer from 0 to (m−2), and in those cases where r is 2 or greater, the Y groups may be the same or different, and in those cases where (m−r−1) is 2 or greater, the X groups may be the same or different, although of the (m−r−1) X groups, at least one X group must be a hydrolyzable group).

(21) A method for producing an organic thin film according to any one of the aspects (1) to (20) above, wherein the hydrolyzable group of the group X is a halogen atom, an alkoxy group of C1 to C6, or an acyloxy group.

(22) A method for producing an organic thin film in which an organic thin film is formed on the surface of a substrate, including a step of bringing the substrate into contact with an organic solvent solution containing a metal-based surfactant having at least one hydroxyl group, wherein the water content within the organic solvent solution is either set or maintained within a predetermined range.

(23) A method for producing an organic thin film according to the aspect (22) above, wherein the water content within the organic solvent solution is either set or maintained within a range from 50 to 1,000 ppm.

(24) A method for producing an organic thin film according to either the aspect (22) or the aspect (23), wherein the metal-based surfactant having at least one hydroxyl group is a compound represented by a formula (III) shown below:

$$R^1{}_n MX_{m-n-1}(OH) \quad (III)$$

(wherein, $R^1$ represents a hydrocarbon group that may contain a substituent, a halogenated hydrocarbon group that may contain a substituent, a hydrocarbon group containing a linkage group, or a halogenated hydrocarbon group containing a linkage group, M represents at least one metal atom selected from a group consisting of a silicon atom, germanium atom, tin atom, titanium atom, and zirconium atom, X represents a hydroxyl group or a hydrolyzable group, n represents an integer from 1 to (m−1), m represents the atomic valence of the metal M, and in those cases where n is 2 or greater, the $R^1$ groups may be the same or different, and in those cases where (m−n−1) is 2 or greater, the X groups may be the same or different).

(25) A method for producing an organic thin film according to any one of the aspects (1) to (24) above, wherein the step of bringing the substrate into contact with the organic solvent solution is conducted within a space that is maintained at a humidity of at least 40% RH.

(26) A method for producing an organic thin film according to any one of the aspects (1) to (24) above, wherein the step of bringing the substrate into contact with the organic solvent solution is conducted within a space that is maintained at a humidity of at least 60% RH.

(27) A method for producing an organic thin film according to any one of the aspects (1) to (26) above, wherein the organic solvent solution is a hydrocarbon-based solvent solution or a fluorinated hydrocarbon-based solvent solution.

(28) A method for producing an organic thin film according to any one of the aspects (1) to (27) above, wherein the organic thin film is a crystalline organic thin film.

(29) A method for producing an organic thin film according to any one of the aspects (1) to (28) above, wherein the organic thin film is a monomolecular film.

(30) A method for producing an organic thin film according to any one of the aspects (1) to (29) above, wherein a substrate containing active hydrogen at the surface is used as the substrate.

(31) A method for producing an organic thin film according to any one of the aspects (1) to (30) above, wherein the substrate is formed from at least one material selected from a group consisting of glass, silicon wafers, ceramics, metals, and plastics.

(32) A method for producing an organic thin film according to any one of the aspects (1) to (31) above, wherein the organic thin film is a chemically adsorbed film.

(33) A method for producing an organic thin film according to any one of the aspects (1) to (32) above, wherein the organic thin film is a self-assembly film.

Furthermore, as a result of discovering that in the aforementioned organic solvent solution, the metal-based surfactant having at least one hydrolyzable group or the metal-based surfactant having at least one hydroxyl group forms an aggregate (aspect 34), the following aspects of the present invention were also identified.

(35) A self-assembly film forming solution for forming a self-assembly film on the surface of a substrate, wherein the molecules for forming the self-assembly film form an aggregate within the solution.

(36) A self-assembly film forming solution according to the aspect (35), wherein the molecules for forming the self-assembly film are molecules of either a metal-based surfactant having at least one hydroxyl group or hydrolyzable group, or a derivative thereof.

(37) A self-assembly film forming solution according to either the aspect (35) or the aspect (36), wherein the aggregate is obtained by treating a metal-based surfactant having at least one hydroxyl group or hydrolyzable group with a catalyst capable of interacting with the metal-based surfactant, and water.

(38) A self-assembly film forming solution according to any one of the aspects (35) to (37), wherein the metal-based surfactant having at least one hydroxyl group or hydrolyzable group is a compound represented by a formula (IV) shown below:

$$R^{11}{}_{n1} M^1 X^1{}_{m1-n1} \quad (IV)$$

(wherein, $R^{11}$ represents a hydrocarbon group that may contain a substituent, a halogenated hydrocarbon group that may contain a substituent, a hydrocarbon group containing a linkage group, or a halogenated hydrocarbon group containing a linkage group, $M^1$ represents at least one metal atom selected from a group consisting of a silicon atom, germanium atom, tin atom, titanium atom, and zirconium atom, $X^1$ represents a hydroxyl group or a hydrolyzable group, $n_1$ represents an integer from 1 to $(m_1-1)$, $m_1$ represents the atomic valence of the metal $M^1$, and in those cases where $n_1$ is 2 or greater, the $R^{11}$ groups may be the same or different, and in those cases where $(m_1-n_1)$ is 2 or greater, the $X^1$ groups may be the same or different).

(39) A self-assembly film forming solution according to any one of the aspects (35) to (37), wherein the metal-based surfactant having at least one hydroxyl group or hydrolyzable group is a compound represented by a formula (V) shown below:

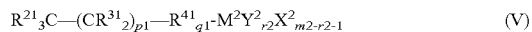

$$R^{21}{}_3 C-(CR^{31}{}_2)_{p1}-R^{41}{}_{q1}-M^2 Y^2{}_{r2} X^2{}_{m2-r2-1} \quad (V)$$

(wherein, $M^2$ represents at least one metal atom selected from a group consisting of a silicon atom, germanium atom, tin atom, titanium atom, and zirconium atom, $X^2$ represents a hydroxyl group or a hydrolyzable group, $R^{21}$ and $R^{31}$ each represent, independently, a hydrogen atom or a fluorine atom, $R^{41}$ represents an alkylene group, vinylene group, ethynylene group, arylene group, or a bivalent linkage group that contains a silicon atom and/or an oxygen atom, $Y^2$ represents a hydrogen atom, or an alkyl group, alkoxy group, fluorine-containing alkyl group, or fluorine-containing alkoxy group, $p_1$ represents either 0 or a natural number, $q_1$ represents either 0 or 1, $r_2$ represents an integer from 0 to $(m_2-2)$, and in those cases where $r_2$ is 2 or greater, the $Y^2$ groups may be the same or different, and in those cases where $(m_2-r_2-1)$ is 2 or greater, the $X^2$ groups may be the same or different).

(40) A self-assembly film forming solution according to any one of the aspects (35) to (39), wherein the hydrolyzable group is a halogen atom, an alkoxy group of C1 to C6, or an acyloxy group.

(41) A self-assembly film forming solution according to any one of the aspects (35) to (40), wherein an average particle diameter of the aggregate is within a range from 10 to 1,000 nm.

(42) A self-assembly film forming solution according to any one of the aspects (35) to (41), wherein the zeta potential of the aggregate is equal to or greater than the zeta potential of the substrate within the same solution.

Furthermore, as a result of discovering that even if the substrate used in the method for producing an organic thin film is not crystalline, the formed organic thin film exhibits crystallinity (aspect 43), the following aspects of the present invention were also identified.

(44) A chemically adsorbed film formed on a substrate, wherein the substrate is not crystalline, and the chemically adsorbed film is crystalline.

(45) A chemically adsorbed film according to the aspect (44), which is formed using a metal-based surfactant having at least one hydroxyl group or hydrolyzable group.

(46) A chemically adsorbed film according to either the aspect (44) or the aspect (45), wherein the chemically adsorbed film is a monomolecular film.

(47) A chemically adsorbed film according to any one of the aspects (44) to (46), wherein the chemically adsorbed film is a self-assembly film.

Furthermore, as a result of discovering that in the method for producing an organic thin film, even if the step for bringing the organic solvent solution into contact with the substrate is a step in which at least one method selected from a group consisting of dipping methods, spin coating methods, roll coating methods, Meyer bar methods, screen printing methods, offset printing methods, brush coating methods, and spray methods is used to apply the organic solvent solution to the surface of the substrate, a monomolecular film can still be produced (aspect 48), the following aspects of the present invention were also identified.

(49) A method for producing a monomolecular film, including a step of applying an organic solvent solution containing a metal-based surfactant having a hydroxyl group, hydrocarbonoxy group, or acyloxy group to the surface of a substrate, using at least one method selected from a group consisting of dipping methods, spin coating methods, roll coating methods, Meyer bar methods, screen printing methods, offset printing methods, brush coating methods, and spray methods.

(50) A method for producing a monomolecular film, wherein an organic solvent solution containing a metal-based surfactant having a hydroxyl group, hydrocarbonoxy group, or acyloxy group is dripped onto a substrate, and pressure is then applied from above the dripped solution to spread the solution across the substrate.

(51) A method for producing a monomolecular film according to the aspect (50), wherein the method for applying pressure from above the dripped solution is a method in which a film, a sheet, or a flat plate is laid on top of the substrate surface and rolled.

(52) A method for producing a monomolecular film according to any one of the aspects (49) to (51), wherein a step of washing the substrate is provided following the application step.

(53) A method for producing a monomolecular film according to any one of the aspects (49) to (52), wherein a step of heating the substrate is provided following the application step.

(54) A method for producing a monomolecular film according to any one of the aspects (49) to (53), wherein the organic solvent solution containing the metal-based surfactant also contains a catalyst capable of interacting with the metal-based surfactant.

As follows is a more detailed description of the present invention.

1) Method for Producing Organic Thin Film

A method for producing an organic thin film according to the present invention includes a step of bringing a substrate into contact with either (a) an organic solvent solution containing a metal-based surfactant having at least one hydrolyzable group, and a catalyst capable of interacting with the metal-based surfactant (hereafter also referred to as the "solution (a)"), or (b) an organic solvent solution containing a metal-based surfactant having at least one hydroxyl group (hereafter also referred to as the "solution (b)"), wherein the water content within the organic solvent solution is either set or maintained within a predetermined range.

There are no particular restrictions on the metal-based surfactant having at least one hydrolyzable group that is used within the solution (a) of the present invention, provided the surfactant contains at least one hydrolyzable functional group and a hydrophobic group within the same molecule, although the surfactant preferably contains a hydrolyzable group that is capable of reacting with an active hydrogen on the substrate surface to form a bond. Examples of other functional groups capable of reacting with an active hydrogen to form a bond include hydroxyl groups, and the surfactant may also comprise a hydroxyl group. Specific examples of this type of metal-based surfactant include the compounds represented by the aforementioned formula (I).

In the formula (I), the group $R^1$ represents a hydrocarbon group that may contain a substituent, a halogenated hydrocarbon group that may contain a substituent, a hydrocarbon group containing a linkage group, or a halogenated hydrocarbon group containing a linkage group.

Examples of the hydrocarbon group within the hydrocarbon group that may contain a substituent include alkyl groups of 1 to 30 carbon atoms such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group, or n-decyl group; alkenyl groups of 2 to 30 carbon atoms, such as a vinyl group, propenyl group, butenyl group, or pentenyl group; and aryl groups such as a phenyl group or naphthyl group.

Examples of the halogenated hydrocarbon group within the aforementioned halogenated hydrocarbon group that may contain a substituent include halogenated alkyl groups of 1 to 30 carbon atoms, halogenated alkenyl groups of 2 to 30 carbon atoms, and halogenated aryl groups. Examples of the halogen atom include a fluorine atom, chlorine atom, or bromine atom, although a fluorine atom is preferred. Specific examples include groups in which one or more hydrogen atoms from the hydrocarbon groups listed above have been substituted with a halogen atom such as a fluorine atom, chlorine atom, or bromine atom.

Of these groups, halogenated hydrocarbon groups in which two or more hydrogen atoms from an alkyl group of 1 to 30 carbon atoms have been substituted with halogen atoms are preferred, and fluorinated alkyl groups in which two or more hydrogen atoms from an alkyl group of 1 to 30 carbon atoms have been substituted with fluorine atoms are particularly desirable. Furthermore, in those cases where the fluorinated alkyl group has a branched structure, the branched portions are preferably short chains of 1 to 4 carbon atoms, and even more preferably 1 to 2 carbon atoms.

Amongst fluorinated alkyl groups, groups in which one or more fluorine atoms are bonded to a terminal carbon atom are preferred, and groups with a —$CF_3$ grouping in which three fluorine atoms are bonded to a terminal carbon atom are particularly desirable, although groups in which the terminals are not substituted with fluorine atoms, but non-terminal carbon atoms within the molecular chain are substituted with a fluorine atom are also suitable. Groups which contain, at a terminal position, a pefluoroalkyl portion in which all of the hydrogen atoms of an alkyl group have been substituted with fluorine atoms, and which contain an alkylene group represented by the formula —$(CH_2)_h$— (wherein, h represents an integer from 1 to 6, and preferably an integer from 2 to 4) between the metal atoms M described below are particularly desirable.

The number of fluorine atoms within the fluorinated alkyl group, when represented by the formula [(number of fluorine atoms within the fluorinated alkyl group)/(number of hydrogen atoms within the equivalent alkyl group with the same number of carbon atoms) ×100]%, is preferably at least 60%, and even more preferably 80% or higher.

Examples of the substituent within the hydrocarbon group that may contain a substituent or the halogenated hydrocarbon group that may contain a substituent include a carboxyl group, amide group, imide group, ester group, an alkoxy group such as a methoxy group or ethoxy group, or a hydroxyl group. The number of these substituents is preferably within a range from 0 to 3.

Examples of the hydrocarbon group within the aforementioned hydrocarbon group containing a linkage group include the same groups listed above as the hydrocarbon group within the hydrocarbon group that may contain a substituent.

Furthermore, examples of the halogenated hydrocarbon group within the aforementioned halogenated hydrocarbon group containing a linkage group include the same groups listed above as the halogenated hydrocarbon group within the halogenated hydrocarbon group that may contain a substituent.

The linkage group preferably exists either between a carbon-carbon bond of the hydrocarbon group or halogenated hydrocarbon group, or between a carbon atom of the hydrocarbon group and the metal atom M described below.

Specific examples of this linkage group include —O—, —S—, —$SO_2$—, —CO—, —C(=O)O—, and —C(=O)$NR^{51}$ (wherein, $R^{51}$ represents a hydrogen atom, or an alkyl group such as a methyl group, ethyl group, n-propyl group, or isopropyl group).

Of the above possibilities, from the viewpoints of water repellency and durability, the $R^1$ group is preferably an alkyl group of 1 to 30 carbon atoms, a fluorinated alkyl group of 1 to 30 carbon atoms, or a fluorinated alkyl group containing a linkage group.

Specific examples of the $R^1$ group include $CH_3$—, $CH_3CH_2$—, $(CH_3)_2CH$—, $(CH_3)_3C$—, $CH_3(CH_2)_2$—, $CH_3(CH_2)_3$—, $CH_3(CH_2)_4$—, $CH_3(CH_2)_5$—, $CH_3(CH_2)_6$—, $CH_3(CH_2)_7$—, $CH_3(CH_2)_8$—, $CH_3(CH_2)_9$—, $CH_3(CH_2)_{10}$—, $CH_3(CH_2)_{11}$—, $CH_3(CH_2)_{12}$—, $CH_3(CH_2)_{13}$—, $CH_3(CH_2)_{14}$—, $CH_3(CH_2)_{15}$—, $CH_3(CH_2)_{16}$—, $CH_3(CH_2)_{17}$—, $CH_3(CH_2)_{18}$—, $CH_3(CH_2)_{19}$—, $CH_3(CH_2)_{20}$—, $CH_3(CH_2)_{21}$—, $CH_3(CH_2)_{22}$—, $CH_3(CH_2)_{23}$—, $CH_3(CH_2)_{24}$—, and $CH_3(CH_2)_{25}$—, $CF_3$—, $CF_3CF_2$—, $(CF_3)_2CF$—, $(CF_3)_3C$—, $CF_3(CH_2)_2$—, $CF_3(CF_2)_3(CH_2)_2$—, $CF_3(CF_2)_5(CH_2)_2$—, $CF_3(CF_2)_7(CH_2)_2$—, $CF_3(CF_2)_3(CH_2)_3$—, $CF_3(CF_2)_5(CH_2)_3$—, $CF_3(CF_2)_7(CH_2)_3$—, $CF_3(CF_2)_4O(CF_2)_2(CH_2)_2$—, $CF_3(CF_2)_4O(CF_2)_2(CH_2)_3$—, $CF_3(CF_2)_7O(CF_2)_2(CH_2)_2$—, $CF_3(CF_2)_7CONH(CH_2)_2$—, $CF_3(CF_2)_7CONH(CH_2)_3$—, and $CF_3(CF_2)_3O[CF(CF_3)CF(CF_3)O]_2CF(CF_3)CONH(CH_2)_3$—, $CH_3(CF_2)_7(CH_2)_2$—, $CH_3(CF_2)_8(CH_2)_2$—, $CH_3(CF_2)_9(CH_2)_2$—, $CH_3(CF_2)_{10}(CH_2)_2$—, $CH_3(CF_2)_{11}(CH_2)_2$—, $CH_3(CF_2)_{12}(CH_2)_2$—, $CH_3(CF_2)_7(CH_2)_3$—, $CH_3(CF_2)_9(CH_2)_3$—, $CH_3(CF_2)_{11}(CH_2)_3$—, $CH_3CH_2(CF_2)_6(CH_2)_2$—, $CH_3CH_2(CF_2)_8(CH_2)_2$—, $CH_3CH_2(CF_2)_{10}(CH_2)_2$—, $CH_3(CF_2)_4O(CF_2)_2(CH_2)_2$—, $CH_3(CF_2)_7(CH_2)_2O(CH_2)_3$—, $CH_3(CF_2)_8(CH_2)_2O(CH_2)_3$—, $CH_3(CF_2)_9(CH_2)_2O(CH_2)_3$—, $CH_3CH_2(CF_2)_6(CH_2)_2O(CH_2)_3$—, $CH_3(CF_2)_6CONH(CH_2)_3$—, $CH_3(CF_2)_8CONH(CH_2)_3$—, and $CH_3(CF_2)_3O[CF(CF_3)CF(CF_3)O]_2CF(CF_3)CONH(CH_2)_3$—, although the present invention is in no way restricted to the above groups.

M represents an atom selected from a group consisting of a silicon atom, germanium atom, tin atom, titanium atom, and zirconium atom. Of these, from the viewpoints of availability and reactivity, a silicon atom is particularly preferred.

X represents a hydroxyl group or a hydrolyzable group, and there are no particular restrictions on the hydrolyzable group, provided it decomposes on reaction with water. Specific examples of the hydrolyzable group include alkoxy groups of 1 to 6 carbon atoms that may contain a substituent, hydrocarbonoxy groups that may contain a substituent, acyloxy groups that may contain a substituent, halogen atoms such as a fluorine atom, chlorine atom, bromine atom, or iodine atom, as well as an isocyanate group, cyano group, amino group, or amide group.

Of these, alkoxy groups of 1 to 6 carbon atoms; hydrocarbonoxy groups such as alicyclic and aromatic hydrocarbonoxy groups, alkenyloxy groups, and aralkyloxy groups; and acyloxy groups such as an acetoxy group; all of which may contain a substituent, are particularly preferred.

Specific examples of suitable alkoxy groups of 1 to 6 carbon atoms include a methoxy group, ethoxy group, n-propoxy group, isopropoxy group, n-butoxy group, sec-butoxy group, t-butoxy group, n-pentyloxy group, and n-hexyloxy group.

Specific examples of suitable acyloxy groups include an acetoxy group, propionyloxy group, propanoyloxy group, n-propylcarbonyloxy group, isopropylcarbonyloxy group, n-butylcarbonyloxy group, and propanoyloxy group; examples of suitable alicyclic hydrocarbonoxy groups include a cyclopropyloxy group, cyclopropylmethyloxy group, cyclohexyloxy group, and norbornyloxy group; examples of suitable alkenyloxy group include an allyloxy group, and a vinyloxy group; examples of suitable alkynyloxy groups include a propargyloxy group; examples of suitable aralkyloxy groups include benzyloxy group, and phenethyloxy group; examples of suitable aromatic hydrocarbonoxy groups include a phenoxy group and a naphthyloxy group; and a benzoyloxy group is also suitable.

Examples of the substituent within these groups include a carboxyl group, amide group, imide group, ester group, or hydroxyl group. Of these possible groups, X is preferably a hydroxyl group, halogen atom, alkoxy group of 1 to 6 carbon atoms, acyloxy group, or isocyanate group, and an alkoxy group of 1 to 4 carbon atoms or an acyloxy group is particularly desirable.

m represents the atomic valence of the metal atom M.

n represents an integer from 1 to (m−1). In order to enable production of a high density organic thin film, n is preferably 1.

In those cases where n is 2 or greater, the $R^1$ groups may be either the same or different.

Furthermore, in those cases where (m−n) is 2 or greater, the X groups may either be the same or different, although of the (m−n) X groups, at least one X group must be a hydrolyzable group.

Of the compounds represented by the formula (I), those compounds represented by the formula (II) represent preferred configurations.

In the formula (II), $R^4$ represents an alkylene group, vinylene group, ethynylene group, arylene group, or a bivalent functional group that contains a silicon atom and/or an oxygen atom. Specific examples of the $R^4$ group include the functional groups shown in the formulas below.

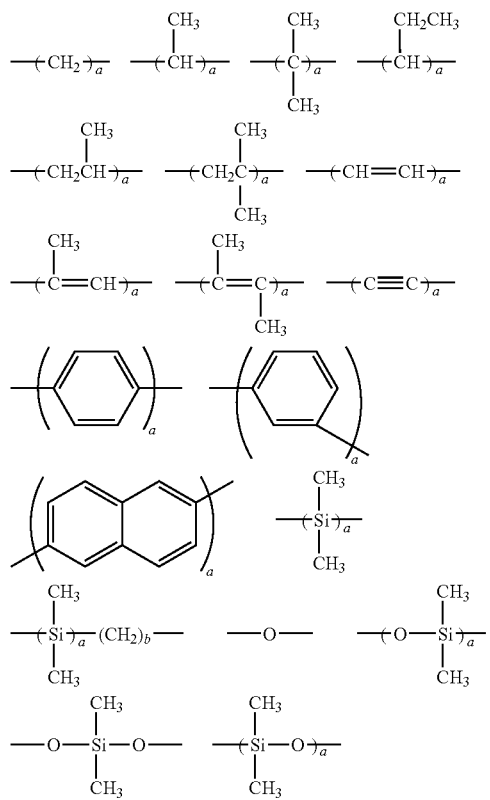

In the above formulas, a and b each represent an arbitrary natural number of at least 1.

Y represents a hydrogen atom; an alkyl group such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, or isohexyl group; an alkoxy group such as a methoxy group, ethoxy group, n-propoxy group, isopropoxy group, n-butoxy group, sec-butoxy group, t-butoxy group, n-pentyloxy group, or n-hexyloxy group; a fluorinated alkyl group in which a portion of, or all of, the hydrogen atoms of an alkyl group have been substituted with fluorine atoms; or a fluorinated alkoxy group in which a portion of, or all of, the hydrogen atoms of an alkoxy group have been substituted with fluorine atoms.

r represents either 0 or an integer from 1 to (m−2), although in order to enable production of a high density adsorbed film, r is preferably 0. In those cases where r is 2 or greater, the Y groups may be the same or different, and in those cases where (m−r−1) is 2 or greater, the X groups may be the same or different. However, of the (m−r−1) X groups, at least one X group must be a hydrolyzable group.

In addition to the compounds represented by the formula (II), other preferred configurations of the compounds represented by the formula (I) include those shown below.

$$CH_3\text{---}(CH_2)_g\text{-}MY_rX_{m-r-1} \quad (1)$$

$$CH_3\text{---}(CH_2)_s\text{---}O\text{---}(CH_2)_t\text{-}MY_rX_{m-r-1} \quad (2)$$

$$CH_3\text{---}(CH_2)_u\text{---}Si(CH_3)_2\text{---}(CH_2)_v\text{-}MY_rX_{m-r-1} \quad (3)$$

$$CF_3COO\text{---}(CH_2)_w\text{-}MY_rX_{m-r-1} \quad (4)$$

In the above formulas, g, s, t, u, v, and w each represent an arbitrary integer, and particularly preferred ranges for these values are from 1 to 25 for g, from 0 to 12 for s, from 1 to 20 for t, from 0 to 12 for u, from 1 to 20 for v, and from 1 to 25 for w.

M, Y, X, r, and m have the same meanings as defined in relation to the formula (II).

Specific examples of compounds represented by the formula (I) include those listed below.

In the following examples, compounds in which the metal atom M is a silicon atom are shown as representative examples, but the present invention is not limited to these cases. Furthermore, the hydrolyzable groups are also not limited to the functional groups shown in the examples, and compounds containing other hydrolyzable groups are also possible.

$CH_3CH_2O(CH_2)_{15}Si(OCH_3)_3$
$CF_3CH_2O(CH_2)_{15}Si(OCH_3)_3$
$CH_3(CH_2)_2Si(CH_3)_2(CH_2)_{15}Si(OCH_3)_3$
$CH_3(CH_2)_6Si(CH_3)_2(CH_2)_9Si(OCH_3)_3$
$CH_3COO(CH_2)_{15}Si(OCH_3)_3$
$CF_3(CF_2)_5(CH_2)_2Si(OCH_3)_3$
$CF_3(CF_2)_7\text{---}(CH{=}CH)_3\text{---}Si(OCH_3)_3$
$CH_3CH_2O(CH_2)_{15}Si(OC_2H_5)_3$
$CH_3(CH_2)_2Si(CH_3)_2(CH_2)_{15}Si(OC_2H_5)_3$
$CH_3(CH_2)_6Si(CH_3)_2(CH_2)_9Si(OC_2H_5)_3$
$CF_3(CH_2)_6Si(CH_3)_2(CH_2)_9Si(OC_2H_5)_3$
$CH_3COO(CH_2)_{15}Si(OC_2H_5)_3$
$CF_3COO(CH_2)_{15}Si(OC_2H_5)_3$
$CF_3COO(CH_2)_{15}Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_5(CH_2)_2Si(OC_2H_5)_3$
$CF_3(CF_2)_7(CH{=}CH)_3Si(OC_2H_5)_3$
$CF_3(CF_2)_9(CH_2)_2Si(OCH_3)_3$
$CF_3(CF_2)_5(CH_2)_2Si(OCH_3)_3$
$CF_3(CF_2)_7(CH_2)_2Si(CH_3)(OC_2H_5)_2$
$CF_3(CF_2)_7(CH_2)_2Si(CH_3)(OCH_3)_2$
$CF_3(CF_2)_7(CH_2)_2Si(CH_3)_2(OC_2H_5)$
$CF_3(CF_2)_7(CH_2)_2Si(CH_3)_2(OCH_3)$
$CF_3(CH_2)_2Si(OCH_3)_3$
$CF_3(CF_2)_3(CH_2)_2Si(OCH_3)_3$
$CF_3(CF_2)_5(CH_2)_2Si(OCH_3)_3$
$CF_3(CF_2)_7(CH_2)_2Si(OCH_3)_3$
$CF_3(CF_2)_3(CH_2)_3Si(OCH_3)_3$
$CF_3(CF_2)_5(CH_2)_3Si(OCH_3)_3$

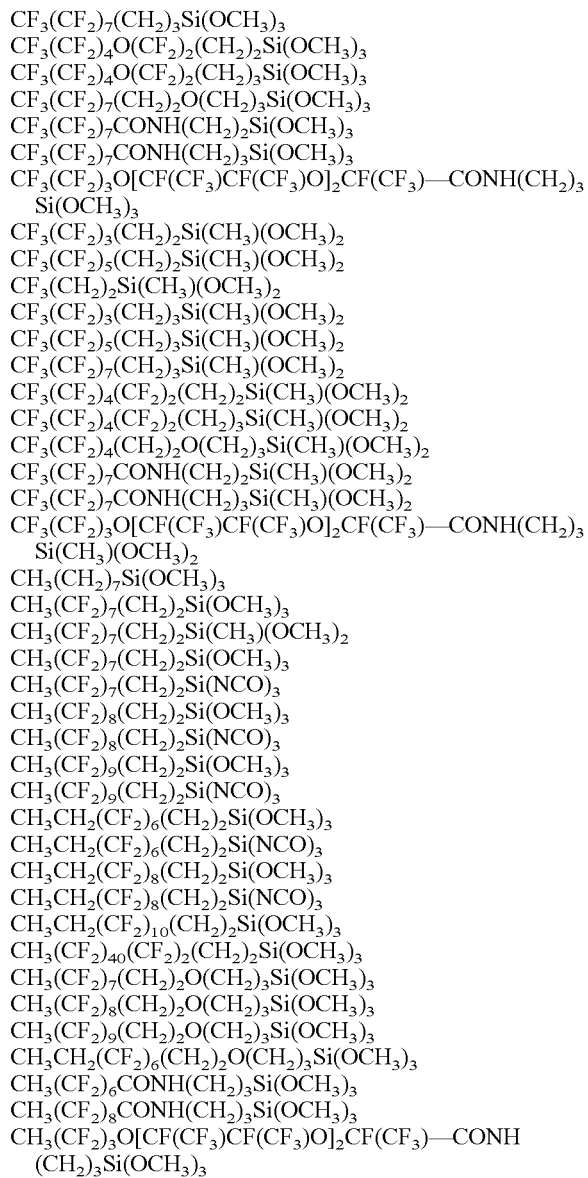

These compounds can be used either alone, or in combinations of two or more different compounds.

There are no particular restrictions on the catalyst capable of interacting with the metal-based surfactant that is incorporated within the solution (a), provided it is capable of generating an interaction via coordination bonding or hydrogen bonding with either the metal portion or the hydrolyzable group portion of the metal-based surfactant, thereby activating the hydrolyzable group or hydroxyl group, and promoting a condensation. Of the possible catalysts, at least one compound selected from a group consisting of metal oxides; metal hydroxides; metal alkoxides; chelated or coordinated metal compounds; partial hydrolysis products of metal alkoxides; hydrolysis products obtained by treating a metal alkoxide with a two-fold or greater equivalence of water; organic acids; silanol condensation catalysts, and acid catalysts is preferred, and metal alkoxides and partial hydrolysis products of metal alkoxides are particularly desirable.

There are no particular restrictions on the metal within these metal oxides; metal hydroxides; metal alkoxides; chelated or coordinated metal compounds; partial hydrolysis products of metal alkoxides; hydrolysis products obtained by treating a metal alkoxide with a two-fold or greater equivalence of water; and silanol condensation catalysts, and at least one metal selected from a group consisting of titanium, zirconium, aluminum, silicon, germanium, indium, tin, tantalum, zinc, tungsten, and lead is preferred, although titanium, zirconium, aluminum or silicon is even more preferred, and titanium is particularly desirable.

Metal oxides in sol, gel, or solid form can be used. There are no particular restrictions on the method used for producing a gel or sol, and taking a silica sol as an example, suitable methods include cation exchange of a sodium silicate solution, and hydrolysis of a silicon alkoxide. Sols that are dispersed stably within an organic solvent are preferred, and sols in which the particle diameter is within a range from 10 to 100 nm, and even more preferably from 10 to 20 nm, are particularly desirable. There are no particular restrictions on the sol shape, and spherical or elongated shapes can be used.

Specific examples of suitable sols include methanol silica sol, IPA-ST, IPA-ST-UP, IPA-ST-ZL, NPC-ST-30, DMAC-ST, MEK-ST, MIBK-ST, XBA-ST, AND PMA-ST (all of which are brand names of organosilica sols manufactured by Nissan Chemical Industries, Ltd.)

There are no particular restrictions on the quantity of metal oxide used, provided it has no effect on the formed chemically adsorbed film, but the use of a quantity that is catalytic relative to the metal-based surfactant is preferred, and an oxide-equivalent quantity of 0.001 to 1 mol, and even more preferably from 0.001 to 0.2 mols, per 1 mol of the metal-based surfactant is particularly desirable. These metal oxides can be used either alone, or in combinations of two or more different compounds.

Suitable metal hydroxides include those produced by any appropriate method, provided the product is a hydroxide of a metal. Examples of suitable methods for producing metal hydroxides include hydrolyzing the types of metal alkoxides described below, and reacting a metal salt with a metal hydroxide. Furthermore, commercially available metal hydroxides may also be purified and used if desired.

There are no particular restrictions on the number of carbon atoms within the alkoxy group of the metal alkoxide, although from the viewpoints of oxide concentration, ease of eliminating organic matter, and availability, alkoxy groups of 1 to 4 carbon atoms are preferred. Specific examples of the metal alkoxides used in the present invention include silicon alkoxides such as $Si(OCH_3)_4$, $Si(OC_2H_5)_4$, $Si(OC_3H_7\text{-i})_4$, and $Si(OC_4H_9\text{-t})_4$; titanium alkoxides such as $Ti(OCH_3)_4$, $Ti(OC_2H_5)_4$, $Ti(OC_3H_7\text{-i})_4$, and $Ti(OC_4H_9)_4$; tetrakistrialkylsiloxy titanium compounds such as $Ti[OSi(CH_3)_3]_4$ and $Ti[OSi(C_2H_5)_3]_4$; zirconium alkoxides such as $Zr(OCH_3)_4$, $Zr(OC_2H_5)_4$, $Zr(OC_3H_7)_4$, and $Zr(OC_4H_9)_4$; aluminum alkoxides such as $Al(OCH_3)_4$, $Al(OC_2H_5)_4$, $Al(OC_3H_7\text{-i})_4$, and $Al(OC_4H_9)_3$; germanium alkoxides such as $Ge(OC_2H_5)_4$; indium alkoxides such as $In(OCH_3)_3$, $In(OC_2H_5)_3$, $In(OC_3H_7\text{-i})_3$, and $In(OC_4H_9)_3$; tin alkoxides such as $Sn(OCH_3)_4$, $Sn(OC_2H_5)_4$, $Sn(OC_3H_7\text{-i})_4$, and $Sn(OC_4H_9)_4$; tantalum alkoxides such as $Ta(OCH_3)_5$, $Ta(OC_2H_5)_5$, $Ta(OC_3H_7\text{-i})_5$, and $Ta(OC_4H_9)_5$; tungsten alkoxides such as $W(OCH_3)_6$, $W(OC_2H_5)_6$, $W(OC_3H_7\text{-i})_6$, and $W(OC_4H_9)_6$; zinc alkoxides such as $Zn(OC_2H_5)_2$; and lead alkoxides such as $Pb(OC_4H_9)_4$. These alkoxides can be used either alone, or in combinations of two or more different compounds.

Furthermore, in the present invention, a composite alkoxide obtained by reacting together two or more metal alkoxides, a composite alkoxide obtained by reacting one or more metal alkoxides with one or more metal salts, or a combination of these composite alkoxides, can also be used as the metal alkoxide.

Examples of composite alkoxides obtained by reacting together two or more metal alkoxides include those composite alkoxides obtained by reacting an alkali metal or alkali earth metal alkoxide with a transition metal alkoxide, and composite alkoxides obtained as complex salts by combining elements from group 3B.

Specific examples include $BaTi(OR)_6$, $SrTi(OR)_6$, $BaZr(OR)_6$, $SrZr(OR)_6$, $LiNb(OR)_6$, $LiTa(OR)_6$, and combinations thereof, as well as products of reaction between a silicon alkoxide and an aforementioned metal alkoxide, and condensation products thereof, such as $LiVO(OR)_4$, $MgAl_2(OR)_8$, $(RO)_3SiOAl(OR')_2$, $(RO)_3SiOTi(OR')_3$, $(RO)_3SiOZr(OR')_3$, $(RO)_3SiOB(OR')_2$, $(RO)_3SiONb(OR')_4$, and $(RO)_3SiOTa(OR')_4$. In these formulas, R and R' represents alkyl groups.

Examples of composite alkoxide obtained by reacting one or more metal alkoxides with one or more metal salts include compounds obtained by reacting a metal salt with a metal alkoxide.

Examples of suitable metal salts include chlorides, nitrates, sulfates, acetates, formates, and oxalates, whereas examples of suitable metal alkoxides include the same metal alkoxides as those listed above.

There are no particular restrictions on the quantity of metal alkoxide used, provided it has no effect on the formed chemically adsorbed film, but the use of a quantity that is catalytic relative to the metal-based surfactant is preferred, and a quantity within a range from 0.001 to 1 mol, and preferably from 0.001 to 0.2 mols, or an oxide-equivalent within a range from 0.001 to 1 mol, and preferably from 0.001 to 0.2 mols, per 1 mol of the metal-based surfactant is particularly desirable. These metal alkoxides can be used either alone, or in combinations of two or more different compounds.

Partial hydrolysis products of metal alkoxides are products obtained prior to complete hydrolysis of the metal alkoxide, and examples include metal oxide sol precursors, or oligmers.

Specific examples include dispersoids that are able to be stably dispersed in an organic solvent without aggregating, even in the absence of acids, bases, and/or dispersion stabilizers. These dispersoids refer to fine particles dispersed within the dispersion system, and refer specifically to colloidal particles and the like. Here, the phrase "stably dispersed without aggregating" means that within the organic solvent, in the absence of acids, bases, and/or dispersion stabilizers, the hydrolysis product dispersoids do not aggregate to form a heterogeneous system, but rather form a uniform system that is preferably transparent. Here, the term "transparent" means that the transmittance of visible light is high, and specifically, refers to a state wherein if the oxide-equivalent concentration of the dispersoid is set to 0.5% by weight, a quartz cell with an optical path length of 1 cm is used, neat organic solvent is used as a comparative sample, and the measurements are conducted using light with a wavelength of 550 nm, then the spectral transmittance is preferably within a range from 80 to 100%. There are no particular restrictions on the particle diameter of the hydrolysis product dispersoid, although in order to achieve a high transmittance relative to visible light, the particle diameter is typically within a range from 1 to 100 nm, and preferably from 1 to 50 nm, and even more preferably from 1 to 10 nm. Acids, bases, and dispersion stabilizers are discussed below.

One example of a favorable method for producing a partial hydrolysis product of a metal alkoxide is a method in which an aforementioned metal alkoxide is hydrolyzed in an organic solvent, in the absence of acids, bases, and/or dispersion stabilizers, using from 0.5 to less than 2.0 mols of water per 1 mol of the metal alkoxide, at a temperature within a range from $-100°$ C. to the reflux temperature of the organic solvent.

Specifically, suitable methods include the following:

(1) a method in which from 0.5 to 1.0 mols of water per 1 mol of the metal alkoxide is added to an organic solvent in the absence of acids, bases, and/or dispersion stabilizers, (2) a method in which from 1.0 to less than 2.0 mols of water per 1 mol of the metal alkoxide is added to an organic solvent, in the absence of acids, bases, and/or dispersion stabilizers, and at a temperature that is no higher than that required to initiate hydrolysis, or at a temperature of no more than $0°$ C., and preferably at a temperature within a range from $-50$ to $-100°$ C., and (3) a method in which from 0.5 to less than 2.0 mols of water per 1 mol of the metal alkoxide is added to an organic solvent at room temperature, in the absence of acids, bases, and/or dispersion stabilizers, but with the rate of the hydrolysis reaction controlled, either by controlling the rate of addition of the water, or by lowering the concentration of the added water by dilution with a water-soluble solvent or the like.

In the method (1) described above, treatment is conducted with a predetermined quantity of water at an arbitrary temperature, and then additional water is added and reacted at a temperature that is no higher than that required to initiate hydrolysis, or at a temperature of no more than $-20°$ C.

The reaction between the metal alkoxide and water can be conducted without using an organic solvent, by simply mixing the metal alkoxide and the water directly, but is preferably conducted in an organic solvent. Specifically, the reaction can be conducted either by a method in which water diluted with the organic solvent is added to an organic solvent solution of the metal alkoxide, or a method in which the metal alkoxide or an organic solvent solution thereof is added to an organic solvent containing suspended or dissolved water, although the former method, in which the water is added afterwards, is preferred.

There are no particular restrictions on the water used, provided it is neutral, although the use of pure water or distilled water is preferred. There are no particular restrictions on the quantity of water used, provided it satisfies the prescribed range described above, and the quantity can be selected so as to achieve a dispersoid with the desired properties.

There are no particular restrictions on the concentration of the metal alkoxide within the organic solvent, provided the concentration inhibits rapid heat generation and provides a suitable level of fluidity to enable stirring, although a concentration within a range from 5 to 30% by weight is typical.

In the method (1) described above, there are no particular restrictions on the reaction temperature for the reaction between the metal alkoxide and water, although a typical temperature is within a range from $-100$ to $+100°$ C., and a temperature within a range from $-20°$ C. to the boiling point of either the organic solvent used or the alcohol produced by the hydrolysis reaction.

In the method (2) described above, the temperature at which the water is added varies depending on the stability of the metal alkoxide used, and although there are no particular restrictions provided the temperature is either no higher than the hydrolysis initiation temperature or no higher than $0°$ C., the addition of the water to the metal alkoxide is preferably conducted at a temperature within a range from $-50°$ C. to $-100°$ C., with the actual temperature dependent on the nature of the metal alkoxide being used. Furthermore, the reaction can also be conducted by adding the water at a low temperature, allowing the mixture to age for a certain period, subsequently conducting hydrolysis at a temperature within a range from room temperature to the reflux temperature of the solvent, and then conducting a dehydration condensation reaction.

In the method (3) described above, the reaction between the metal alkoxide and water is conducted at a cooled temperature that can be achieved without special cooling equipment, for example, a temperature within a range from 0° C. to room temperature, and the hydrolysis rate is controlled using a factor other than temperature, such as by controlling the rate of addition of the water. Reaction can also be conducted allowing the mixture to age for a certain period, subsequently conducting hydrolysis at a temperature within a range from room temperature to the reflux temperature of the solvent, and then conducting a dehydration condensation reaction.

The organic solvent used is preferably capable of dispersing the hydrolysis product of the metal alkoxide as a dispersoid, and because the reaction for treating the metal-based surfactant with water can be conducted at low temperatures, a solvent that exhibits high water solubility and does not freeze at low temperatures is preferred.

Specific examples of suitable solvents include alcohols such as methanol, ethanol, and isopropanol; halogenated hydrocarbon-based solvents such as methylene chloride, chloroform, and chlorobenzene; hydrocarbon-based solvents such as hexane, cyclohexane, benzene, toluene, and xylene; ether-based solvents such as tetrahydrofuran, diethyl ether, and dioxane; ketone-based solvents such as acetone, methyl ethyl ketone, and methyl isobutyl ketone; amide-based solvents such as dimethylformamide and N-methylpyrrolidone; sulfoxide-based solvents such as dimethylsulfoxide; and silicones such as methylpolysiloxane, octamethylcyclotetrasiloxane, decamethylcyclopentasiloxane, and methylphenylpolysiloxane (for example, see Japanese Unexamined Patent Application, First Publication No. Hei 9-208438).

These solvents can be used either alone, or in mixtures of two or more different solvents.

In the case of a mixed solvent, a combination of a hydrocarbon-based solvent such as toluene or xylene, and a lower alcohol-based solvent such as methanol, ethanol, isopropanol, or t-butanol is preferred. In such cases, the use of a secondary or higher alcohol-based solvent such as isopropanol or t-butanol as the lower alcohol-based solvent is particularly preferred. There are no particular restrictions on the mixing ratio of the mixed solvent, although the use of a hydrocarbon-based solvent and a lower alcohol-based solvent in a volumetric ratio within a range from 99/1 to 50/50 is preferred.

Furthermore, in the hydrolysis of the metal alkoxide by water, an acid, base, or dispersion stabilizer may also be added. There are no particular restrictions on the acid or base added, provided it functions as a deflocculant for re-dispersing any precipitate that settles out, or as a catalyst for the hydrolysis and dehydration condensation of the metal alkoxide to produce a dispersoid of colloidal particles or the like, and as a dispersing agent for the produced dispersoid.

In such cases, there are no particular restrictions on the acid or base, provided it functions as a deflocculant for re-dispersing any precipitate that settles out, or as mentioned above, as a catalyst for the hydrolysis and dehydration condensation of the metal alkoxide to produce a dispersoid of colloidal particles or the like, and as a dispersing agent for the produced dispersoid.

Examples of suitable acids include mineral acids such as hydrochloric acid, nitric acid, boric acid, and fluoroboric acid; organic acids such as acetic acid, formic acid, oxalic acid, carbonic acid, trifluoroacetic acid, p-toluenesulfonic acid, and methane sulfonic acid; and photoacid generators that generate acid on irradiation such as diphenyliodonium hexafluorophosphate and triphenylsulfonium hexafluorophosphate.

Examples of suitable bases include triethanolamine, triethylamine, 1,8-diazabicyclo[5.4.0]-7-undecene, ammonia, dimethylformamide, and phophine.

Examples of suitable dispersion stabilizers include reagents that are effective in dispersing the dispersoid stably within the dispersion medium, and coagulation inhibitors such as deflocculants, protective colloids, and surfactants. Specific examples include polyvalent carboxylic acids such as glycolic acid, gluconic acid, lactic acid, tartaric acid, citric acid, malic acid, and succinic acid; hydroxycarboxylic acids; phosphoric acids such as pyrophosphoric acid and tripolyphosphoric acid; polydentate ligand compounds that exhibit a powerful chelating effect relative to metal atoms, such as acetylacetone, methyl acetoacetate, ethyl acetoacetate, n-propyl acetoacetate, isopropyl acetoacetate, n-butyl acetoacetate, sec-butyl acetoacetate, t-butyl acetoacetate, 2,4-hexanedione, 2,4-heptanedione, 3,5-heptanedione, 2,4-octanedione, 2,4-nonaedione, and 5-methylhexanedione; aliphatic amine-based and hydrostearic acid-based polyesteramines such as Solsperse 3000, 9000, 17000, 20000, and 24000 (all manufactured by Zeneca Inc.), and Disperbyk-161, -162, -163, and -164 (all manufactured by BYK-Chemie GmbH); and silicone compounds such as dimethylpolysiloxane-methyl(polysiloxyalkylene)siloxane copolymers, trimethylsiloxysilicic acid, carboxy-modified silicone oil, and amine-modified silicone (see Japanese Unexamined Patent Application, First Publication No. Hei 9-208438 and Japanese Unexamined Patent Application, First Publication No. 2000-53421).

There are no particular restrictions on the quantity used of the metal alkoxide partial hydrolysis product, provided it has no effect on the formed organic thin film, but the use of a quantity that is catalytic relative to the metal-based surfactant is preferred, and an oxide-equivalent quantity of 0.001 to 1 mol, and even more preferably from 0.001 to 0.2 mols, per 1 mol of the metal-based surfactant is particularly desirable. These metal alkoxide partial hydrolysis products can be used either alone, or in combinations of two or more different compounds.

A metal alkoxide hydrolysis product used in the present invention is a product obtained by hydrolyzing a metal oxide with a two-fold or greater equivalence of water.

This hydrolysis product may be either obtained by hydrolyzing a metal alkoxide with a two-fold or greater equivalence of water, or by producing a partial hydrolysis product of the metal alkoxide by conducting hydrolysis with a quantity of water less than a two-fold equivalence relative to the metal alkoxide, and then further hydrolyzing that partial hydrolysis product with an additional predetermined quantity of water (so that when added to the quantity of water used in the partial hydrolysis, the total quantity of water is a two-fold or greater equivalence relative to the metal alkoxide).

The reaction between the metal alkoxide and water can be conducted without using an organic solvent, by simply mixing the metal alkoxide and the water directly, although in the present invention, the metal alkoxide and water are preferably reacted together in an organic solvent.

There are no particular restrictions on the water used, provided it is neutral, although from the viewpoints of minimizing impurities and achieving a dense organic thin film, the use of pure water, distilled water, or ion exchange water is preferred.

The quantity of water used is preferably a two-fold or greater equivalence relative to the metal alkoxide, and preferably a 2.0 to 8-fold equivalence, and most preferably a 3 to 5-fold equivalence.

Suitable methods of reacting a metal alkoxide and water within an organic solvent include the following:
(1) a method in which either water, or water that has been diluted with an organic solvent, is added to an organic solvent solution of the metal alkoxide, and
(2) a method in which the metal alkoxide or an organic solvent solution thereof is added to an organic solvent containing suspended or dissolved water. In this case, there are no particular restrictions on the concentration of the metal alkoxide within the organic solvent, provided the concentration inhibits rapid heat generation and provides a suitable level of fluidity to enable stirring, although a concentration within a range from 5 to 30% by weight is preferred.

The organic solvent used is preferably capable of dispersing the hydrolysis product of the metal alkoxide as a dispersoid, and specific examples include the same organic solvents as those listed in relation to partial hydrolysis products of metal alkoxides.

Furthermore, in addition to the organic solvent, the use of water, acids, bases, or dispersion stabilizers with the hydrolysis product is also as described above in relation to partial hydrolysis products, and the same compounds can be used with no particular restrictions.

The metal alkoxide hydrolysis reaction temperature varies depending on factors such as the reactivity and stability of the metal alkoxide used, but is typically within a range from $-100°$ C. to the reflux temperature of the organic solvent, and is preferably within a range from $-100°$ C. to $-20°$ C. Hydrolysis can also be conducted by adding the water at a low temperature, allowing the mixture to age for a certain period, and then raising the temperature of the reaction liquid to a temperature within a range from room temperature to the reflux temperature of the solvent to effect the hydrolysis and dehydration condensation reaction.

Chelated or coordinated metal compounds can be produced by taking a solution of a metal compound, and then adding a chelating agent or coordination compound that is capable of forming a complex with the metal of the metal compound. There are no particular restrictions on the chelating agents or coordination compounds used, provided they are capable of chelating or coordinating the metal of metal hydroxides, metal alkoxides, or hydrolysis products obtained by treating metal alkoxides with water, thereby forming a complex.

Specific examples of suitable chelating agents or coordination compounds include saturated aliphatic carboxylic acids such as acetic acid, propionic acid, butyric acid, valeric acid, lauric acid, myristic acid, palmitic acid, and stearic acid; saturated aliphatic dicarboxylic acids such as oxalic acid, malonic acid, succinic acid, glutaric acid, adipic acid, pimelic acid, suberic acid, azelaic acid, and sebacic acid; unsaturated carboxylic acids such as acrylic acid, methacrylic acid, crotonic acid, aleic acid, and maleic acid; aromatic carboxylic acids such as benzoic acid, toluic acid, and phthalic acid; halogenocarboxylic acids such as chloroacetic acid and trifluoroacetic acid; β-diketones such as acetylacetone, benzoylacetone, and hexafluoroacetylacetone; β-ketoesters such as methyl acetoacetate and ethyl acetoacetate; and heterocyclic compounds such as tetrahydrofuran, furan, furancarboxylic acid, thiophene, thiophenecarboxylic acid, pyridine, nicotinic acid, and isonicotinic acid. These compounds can be used either alone, or in combinations of two or more different compounds.

The quantity added of the chelating agent or coordination compound is typically within a range from 0.1 to 10 mols, and preferably from 0.3 to 2 mols, and even more preferably from 0.5 to 1.2 mols, per 1 mol of metal within the metal hydroxide metal alkoxide, or hydrolysis product obtained by treating a metal alkoxide with water.

Following addition of the chelating agent or coordination compound, a solution of the metal complex can be obtained by stirring the combined mixture thoroughly. The temperature at which this stirring is conducted is typically within a range from $0°$ C. to the boiling point of the solvent being used. The stirring time is typically within a range from several minutes to several hours. The chelated or coordinated metal compound can be isolated prior to use, or the chelated or coordinated metal compound solution obtained on addition of the chelating agent or coordination compound to the solution of the metal compound can simply be used. Furthermore, the prepared solution of the chelated or coordinated metal compound can also be stored.

Examples of suitable silanol condensation catalysts include carboxylic acid metal salts, carboxylate metal salts, carboxylic acid metal salt polymers, carboxylic acid metal salt chelates, titanate esters, and titanate ester chelates. Specific examples include stannous acetate, dibutyltin dilaurate, dibutyltin dioctate, dibutyltin diacetate, dioctyltin dilaurate, dioctyltin dioctate, dioctyltin diacetate, stannous dioctanoate, lead naphthenate, cobalt naphthenate, iron 2-ethylhexanoate, dioctyltin bisoctylthioglycolate, dioctyltin maleate, dibutyltin maleate polymer, dimethyltin mercaptopropionate polymer, dibutyltin bisacetylacetate, dioctyltin bisacetyllaurate, titanium tetraethoxide, titanium tetrabutoxide, titanium tetraisopropoxide, and titanium bis(acetylacetonyl)dipropoxide.

Examples of the organic acids that can be used in the present invention include saturated aliphatic monocarboxylic acids such as formic acid, acetic acid, propionic acid, butyric acid, isobutyric acid, valeric acid, isovaleric acid, pivalic acid, hexanoic acid, octanoic acid, decanoic acid, lauric acid, myristic acid, palmitic acid, and stearic acid; saturated aliphatic dicarboxylic acids such as oxalic acid, malonic acid, succinic acid, glutaric acid, and adipic acid; unsaturated aliphatic monocarboxylic acids such as acrylic acid, propiolic acid, methacrylic acid, crotonic acid, isocrotonic acid, and oleic acid; unsaturated aliphatic dicarboxylic acids such as fumaric acid and maleic acid; aromatic carboxylic acids such as benzoic acid, 4-chlorobenzoic acid, and naphthalenecarboxylic acid; aliphatic carboxylic acids that have been substituted with a halogen atom, such as monochloroacetic acid and trifluoroacetic acid; hydroxycarboxylic acids such as glycolic acid, lactic acid, malic acid, and citric acid; aliphatic carboxylic acids that have been substituted with an aromatic group, such as phenylacetic acid and 3-phenylpropionic acid; and sulfonic acids such as benzenesulfonic acid, p-toluenesulfonic acid, and methanesulfonic acid.

Of these organic acids, from the viewpoints of providing excellent activation of the hydrolyzable group of the metal-based surfactant, and ease of handling, organic acids with a pKa value (the negative of the log of the acid dissociation constant) within a range from 1 to 6 are preferred, and organic acids with a pKa value from 2 to 5 are particularly desirable.

The acid dissociation constant Ka can be measured accurately by potentiometry, using a variety of different electrodes such as glass electrodes, metal electrodes, metal amalgam electrodes, oxidation-reduction electrodes, and ion selective electrodes. In the present invention, the acid dissociation constant Ka can be determined by measuring the pH within an aqueous solution (or in the case of materials that are insoluble in water, within a mixed solvent of water and a suitable organic solvent, or within a suitable organic solvent). Depending on the measurement conditions, the pKa value may vary by approximately ±0.3. The acid dissociation constants Ka and pKa values for a variety of organic acids are disclosed in A. E. Martell, R. M. Smith, Critical Stability Constants, Vol. 1, 2, 3, 5, Plenum Press (1974, 1975, 1977, 1982).

Examples of suitable acid catalysts include mineral acids such as hydrochloric acid, nitric acid, boric acid, and fluoroboric acid, organic acids such as acetic acid, formic acid, oxalic acid, carbonic acid, trifluoroacetic acid, p-toluenesulfonic acid, and methanesulfonic acid, and photoacid generators that generate acid on irradiation such as diphenyliodonium hexafluorophosphate and triphenylsulfonium hexafluorophosphate.

There are no particular restrictions on the metal-based surfactant having at least one hydroxyl group that is used within the aforementioned solution (b), provided the surfactant contains at least one hydroxyl group and a hydrophobic group within the same molecule. Specific examples of this type of metal-based surfactant include the compounds represented by the aforementioned formula (III).

In the formula (III), $R^1$, M, X, n, and m are as defined above. In those cases where (m−n−1) is 2 or greater, the X groups may be the same or different.

Furthermore, in addition to the metal-based surfactant having at least one hydroxyl group, the solution (b) may also contain a catalyst capable of interacting with the metal-based surfactant. Examples of this catalyst include the same catalysts as those used in the aforementioned solution (a).

Specific examples of compounds represented by the formula (III) include those listed below. In the following examples, compounds in which the metal atom M is a silicon atom are shown as representative examples, but the present invention is not limited to these cases.

$CH_3CH_2O(CH_2)_{15}Si(OCH_3)(OH)_2$
$CF_3CH_2O(CH_2)_{15}Si(OCH_3)_1(OH)_2$
$CH_3(CH_2)_2Si(CH_3)_2(CH_2)_{15}Si(OCH_3)(OH)_2$
$CH_3(CH_2)_6Si(CH_3)_2(CH_2)_9Si(OCH_3)(OH)_2$
$CH_3COO(CH_2)_{15}Si(OCH_3)(OH)_2$
$CF_3(CF_2)_5(CH_2)_2Si(OCH_3)(OH)_2$
$CF_3(CF_2)_7(CH=CH)_3Si(OCH_3)(OH)_2$
$CH_3CH_2O(CH_2)_{15}Si(OC_2H_5)(OH)_2$
$CH_3(CH_2)_2Si(CH_3)_2(CH_2)_{15}Si(OC_2H_5)(OH)_2$
$CH_3(CH_2)_6Si(CH_3)_2(CH_2)_9Si(OC_2H_5)(OH)_2$
$CF_3(CH_2)_6Si(CH_3)_2(CH_2)_9Si(OC_2H_5)(OH)_2$
$CH_3COO(CH_2)_{15}Si(OC_2H_5)(OH)_2$
$CF_3COO(CH_2)_{15}Si(OC_2H_5)(OH)_2$
$CF_3COO(CH_2)_{15}Si(OCH_3)(OH)_2$
$CF_3(CF_2)_9(CH_2)_2Si(OC_2H_5)(OH)_2$
$CF_3(CF_2)_7(CH_2)_2Si(OC_2H_5)(OH)_2$
$CF_3(CF_2)_5(CH_2)_2Si(OC_2H_5)(OH)_2$
$CF_3(CF_2)_7(CH=CH)_3Si(OC_2H_5)(OH)_2$
$CF_3(CF_2)_9(CH_2)_2Si(OCH_3)(OH)_2$
$CF_3(CF_2)_5(CH_2)_2Si(OCH_3)(OH)_2$
$CF_3(CF_2)_7(CH_2)_2Si(CH_3)(OH)_2$
$CF_3(CF_2)_9(CH_2)_2Si(CH_3)(OH)_2$
$CH_3CH_2O(CH_2)_{15}Si(OCH_3)_2(OH)$
$CF_3CH_2O(CH_2)_{15}Si(OCH_3)_2(OH)$
$CH_3(CH_2)_2Si(CH_3)_2(CH_2)_{15}Si(OCH_3)_2(OH)$
$CH_3(CH_2)_6Si(CH_3)_2(CH_2)_9Si(OCH_3)_2(OH)$
$CH_3COO(CH_2)_{15}Si(OCH_3)_2(OH)$
$CF_3(CF_2)_5(CH_2)_2Si(OCH_3)_2(OH)$
$CH_3CH_2O(CH_2)_{15}Si(OC_2H_5)_2(OH)$
$CF_3(CF_2)_7(CH=CH)_3Si(OCH_3)_2(OH)$
$CH_3(CH_2)_2Si(CH_3)_2(CH_2)_{15}Si(OC_2H_5)_2(OH)$
$CH_3(CH_2)_6Si(CH_3)_2(CH_2)_9Si(OC_2H_5)_2(OH)$
$CF_3(CH_2)_6Si(CH_3)_2(CH_2)_9Si(OC_2H_5)_2(OH)$
$CH_3COO(CH_2)_{15}Si(OC_2H_5)_2(OH)$
$CF_3COO(CH_2)_{15}Si(OC_2H_5)_2(OH)$
$CF_3COO(CH_2)_{15}Si(OCH_3)_2(OH)$
$CF_3(CF_2)_9(CH_2)_2Si(OC_2H_5)_2(OH)$
$CF_3(CF_2)_7(CH_2)_2Si(OC_2H_5)_2(OH)$
$CF_3(CF_2)_5(CH_2)_2Si(OC_2H_5)_2(OH)$
$CF_3(CF_2)_7(CH=CH)_3Si(OC_2H_5)_2(OH)$
$CF_3(CF_2)_9(CH_2)_2Si(OCH_3)_2(OH)$
$CF_3(CF_2)_5(CH_2)_2Si(OCH_3)_2(OH)$
$CF_3(CF_2)_7(CH_2)_2Si(CH_3)(OC_2H_5)(OH)$
$CF_3(CF_2)_7(CH_2)_2Si(CH_3)(OCH_3)(OH)$
$CF_3(CH_2)_2Si(OCH_3)(OH)_2$
$CF_3(CF_2)_3(CH_2)_2Si(OCH_3)(OH)_2$
$CF_3(CF_2)_5(CH_2)_2Si(OCH_3)(OH)_2$
$CF_3(CF_2)_7(CH_2)_2Si(OCH_3)(OH)_2$
$CF_3(CF_2)_3(CH_2)_3Si(OCH_3)(OH)_2$
$CF_3(CF_2)_5(CH_2)_3Si(OCH_3)(OH)_2$
$CF_3(CF_2)_7(CH_2)_3Si(OCH_3)(OH)_2$
$CF_3(CF_2)_4O(CF_2)_2(CH_2)_2Si(OCH_3)(OH)_2$
$CF_3(CF_2)_4O(CF_2)_2(CH_2)_3Si(OCH_3)(OH)_2$
$CF_3(CF_2)_7(CH_2)_2O(CH_2)_3Si(OCH_3)(OH)_2$
$CF_3(CF_2)_7CONH(CH_2)_2Si(OCH_3)(OH)_2$
$CF_3(CF_2)_7CONH(CH_2)_3Si(OCH_3)(OH)_2$
$CF_3(CF_2)_3O[CF(CF_3)CF(CF_3)O]_2CF(CF_3)CONH(CH_2)_3Si(OCH_3)(OH)_2$
$CF_3(CH_2)_2Si(OCH_3)_2(OH)$
$CF_3(CF_2)_3(CH_2)_2Si(OCH_3)_2(OH)$
$CF_3(CF_2)_5(CH_2)_2Si(OCH_3)_2(OH)$
$CF_3(CF_2)_7(CH_2)_2Si(OCH_3)_2(OH)$
$CF_3(CF_2)_3(CH_2)_3Si(OCH_3)_2(OH)$
$CF_3(CF_2)_5(CH_2)_3Si(OCH_3)_2(OH)$
$CF_3(CF_2)_7(CH_2)_3Si(OCH_3)_2(OH)$
$CF_3(CF_2)_4O(CF_2)_2(CH_2)_2Si(OCH_3)_2(OH)$
$CF_3(CF_2)_4O(CF_2)_2(CH_2)_3Si(OCH_3)_2(OH)$
$CF_3(CF_2)_7(CH_2)_2O(CH_2)_3Si(OCH_3)_2(OH)$
$CF_3(CF_2)_7CONH(CH_2)_2Si(OCH_3)_2(OH)$
$CF_3(CF_2)_7CONH(CH_2)_3Si(OCH_3)_2(OH)$
$CF_3(CF_2)_3O[CF(CF_3)CF(CF_3)O]_2CF(CF_3)CONH(CH_2)_3Si(OCH_3)_2(OH)$
$CH_3(CH_2)_7Si(OCH_3)(OH)_2$
$CH_3(CF_2)_7(CH_2)_2Si(OCH_3)(OH)_2$
$CH_3(CF_2)_7(CH_2)_2Si(NCO)(OH)_2$
$CH_3(CF_2)_8(CH_2)_2Si(OCH_3)(OH)_2$
$CH_3(CF_2)_8(CH_2)_2Si(NCO)(OH)_2$
$CH_3(CF_2)_9(CH_2)_2Si(OCH_3)(OH)_2$
$CH_3(CF_2)_9(CH_2)_2Si(NCO)(OH)_2$
$CH_3CH_2(CF_2)_6(CH_2)_2Si(OCH_3)(OH)_2$
$CH_3CH_2(CF_2)_6(CH_2)_2Si(OCH_3)(OH)_2$
$CH_3CH_2(CF_2)_6(CH_2)_2Si(NCO)(OH)_2$
$CH_3CH_2(CF_2)_8(CH_2)_2Si(OCH_3)(OH)_2$
$CH_3CH_2(CF_2)_8(CH_2)_2Si(NCO)(OH)_2$
$CH_3CH_2(CF_2)_{10}(CH_2)_2Si(OCH_3)(OH)_2$
$CH_3(CF_2)_4O(CF_2)_2(CH_2)_2Si(OCH_3)(OH)_2$
$CH_3(CF_2)_7(CH_2)_2O(CH_2)_3Si(OCH_3)(OH)_2$
$CH_3(CF_2)_8(CH_2)_2O(CH_2)_3Si(OCH_3)(OH)_2$
$CH_3(CF_2)_9(CH_2)_2O(CH_2)_3Si(OCH_3)(OH)_2$
$CH_3CH_2(CF_2)_6(CH_2)_2O(CH_2)_3Si(OCH_3)(OH)_2$
$CH_3(CF_2)_6CONH(CH_2)_3Si(OCH_3)(OH)_2$
$CH_3(CF_2)_8CONH(CH_2)_3Si(OCH_3)(OH)_2$
$CH_3(CF_2)_3O[CF(CF_3)CF(CF_3)O]_2CF(CF_3)CONH(CH_2)_3Si(OCH_3)(OH)_2$
$CF_3(CF_2)_3(CH_2)_2Si(CH_3)(OCH_3)(OH)$
$CF_3(CF_2)_5(CH_2)_2Si(CH_3)(OCH_3)(OH)$
$CF_3(CH_2)_2Si(CH_3)(OCH_3)(OH)$
$CF_3(CF_2)_3(CH_2)_3Si(CH_3)(OCH_3)(OH)$ $CF_3(CF_2)_5(CH_2)_3Si(CH_3)(OCH_3)(OH)$
$CF_3(CF_2)_7(CH_2)_3Si(CH_3)(OCH_3)(OH)$
$CF_3(CF_2)_4(CF_2)_2(CH_2)_2Si(CH_3)(OCH_3)(OH)$
$CF_3(CF_2)_4(CF_2)_2(CH_2)_3Si(CH_3)(OCH_3)(OH)$
$CF_3(CF_2)_4(CH_2)_2O(CH_2)_3Si(CH_3)(OCH_3)(OH)$
$CF_3(CF_2)_7CONH(CH_2)_2Si(CH_3)(OCH_3)(OH)$
$CF_3(CF_2)_7CONH(CH_2)_3Si(CH_3)(OCH_3)(OH)$
$CF_3(CF_2)_3O[CF(CF_3)CF(CF_3)O]_2CF(CF_3)CONH(CH_2)_3Si(CH_3)(OCH_3)(OH)$
$CH_3(CH_2)_7Si(OCH_3)_2(OH)$
$CH_3(CF_2)_7(CH_2)_2Si(OCH_3)_2(OH)$
$CH_3(CF_2)_7(CH_2)_2Si(CH_3)(OCH_3)(OH)$
$CH_3(CF_2)_7(CH_2)_2Si(OCH_3)_2(OH)$
$CH_3(CF_2)_7(CH_2)_2Si(NCO)_2(OH)$
$CH_3(CF_2)_8(CH_2)_2Si(OCH_3)_2(OH)$
$CH_3(CF_2)_8(CH_2)_2Si(NCO)_2(OH)$
$CH_3(CF_2)_9(CH_2)_2Si(OCH_3)_2(OH)$
$CH_3(CF_2)_9(CH_2)_2Si(NCO)_2(OH)$
$CH_3CH_2(CF_2)_6(CH_2)_2Si(OCH_3)_2(OH)$
$CH_3CH_2(CF_2)_6(CH_2)_2Si(NCO)_2(OH)$
$CH_3CH_2(CF_2)_8(CH_2)_2Si(OCH_3)_2(OH)$
$CH_3CH_2(CF_2)_8(CH_2)_2Si(NCO)_2(OH)$
$CH_3CH_2(CF_2)_{10}(CH_2)_2Si(OCH_3)_2(OH)$
$CH_3(CF_2)_{40}(CF_2)_2(CH_2)_2Si(OCH_3)_2(OH)$
$CH_3(CF_2)_7(CH_2)_2O(CH_2)_3Si(OCH_3)_2(OH)$
$CH_3(CF_2)_8(CH_2)_2O(CH_2)_3Si(OCH_3)_2(OH)$
$CH_3(CF_2)_9(CH_2)_2O(CH_2)_3Si(OCH_3)_2(OH)$
$CH_3CH_2(CF_2)_6(CH_2)_2O(CH_2)_3Si(OCH_3)_2(OH)$
$CH_3(CF_2)_6CONH(CH_2)_3Si(OCH_3)_2(OH)$
$CH_3(CF_2)_8CONH(CH_2)_3Si(OCH_3)_2(OH)$
$CH_3(CF_2)_3O[CF(CF_3)CF(CF_3)O]_2CF(CF_3)CONH(CH_2)_3Si(OCH_3)_2(OH)$
$CH_3CH_2O(CH_2)_{15}Si(OH)_3$
$CF_3CH_2O(CH_2)_{15}Si(OH)_3$
$CH_3(CH_2)_2Si(CH_3)_2(CH_2)_{15}Si(OH)_3$
$CH_3(CH_2)_6Si(CH_3)_2(CH_2)_9Si(OH)_3$
$CH_3COO(CH_2)_{15}Si(OH)_3$
$CF_3(CF_2)_5(CH_2)_2Si(OH)_3$
$CF_3(CF_2)_7(CH=CH)_3Si(OH)_3$
$CH_3CH_2O(CH_2)_{15}Si(OH)_3$
$CH_3(CH_2)_2Si(CH_3)_2(CH_2)_{15}Si(OH)_3$
$CH_3(CH_2)_6Si(CH_3)_2(CH_2)_9Si(OH)_3$
$CF_3(CH_2)_6Si(CH_3)_2(CH_2)_9Si(OH)_3$
$CH_3COO(CH_2)_{15}Si(OH)_3$
$CF_3COO(CH_2)_{15}Si(OH)_3$
$CF_3(CF_2)_9(CH_2)_2Si(OH)_3$
$CF_3(CF_2)_7(CH_2)_2Si(OH)_3$
$CF_3(CF_2)_5(CH_2)_2Si(OH)_3$
$CF_3(CF_2)_7(CH=CH)_3Si(OH)_3$
$CF_3(CF_2)_9(CH_2)_2Si(OH)_3$
$CF_3(CF_2)_5(CH_2)_2Si(OH)_3$
$CF_3(CF_2)_7(CH_2)_2Si(CH_3)_2(OH)$
$CF_3(CH_2)_2Si(OH)_3$
$CF_3(CF_2)_3(CH_2)_2Si(OH)_3$
$CF_3(CF_2)_5(CH_2)_2Si(OH)_3$
$CF_3(CF_2)_7(CH_2)_2Si(OH)_3$
$CF_3(CF_2)_3(CH_2)_3Si(OH)_3$
$CF_3(CF_2)_5(CH_2)_3Si(OH)_3$
$CF_3(CF_2)_7(CH_2)_3Si(OH)_3$
$CF_3(CF_2)_4O(CF_2)_2(CH_2)_2Si(OH)_3$
$CF_3(CF_2)_4O(CF_2)_2(CH_2)_3Si(OH)_3$
$CF_3(CF_2)_7(CH_2)_2O(CH_2)_3Si(OH)_3$
$CF_3(CF_2)_7CONH(CH_2)_2Si(OH)_3$
$CF_3(CF_2)_7CONH(CH_2)_3Si(OH)_3$
$CF_3(CF_2)_3O[CF(CF_3)CF(CF_3)O]_2CF(CF_3)CONH(CH_2)_3Si(OH)_3$
$CH_3(CH_2)_7Si(OH)_3$
$CH_3(CF_2)_7(CH_2)_2Si(OH)_3$
$CH_3(CF_2)_7(CH_2)_2Si(OH)_3$
$CH_3(CF_2)_8(CH_2)_2Si(OH)_3$
$CH_3(CF_2)_9(CH_2)_2Si(OH)_3$
$CH_3CH_2(CF_2)_6(CH_2)_2Si(OH)_3$
$CH_3CH_2(CF_2)_8(CH_2)_2Si(OH)_3$
$CH_3CH_2(CF_2)_{10}(CH_2)_2Si(OH)_3$
$CH_3(CF_2)_{40}(CF_2)_2(CH_2)_2Si(OH)_3$
$CH_3(CF_2)_7(CH_2)_2O(CH_2)_3Si(OH)_3$
$CH_3(CF_2)_8(CH_2)_2O(CH_2)_3Si(OH)_3$
$CH_3(CF_2)_9(CH_2)_2O(CH_2)_3Si(OH)_3$
$CH_3CH_2(CF_2)_6(CH_2)_2O(CH_2)_3Si(OH)_3$
$CH_3(CF_2)_6CONH(CH_2)_3Si(OH)_3$
$CH_3(CF_2)_8CONH(CH_2)_3Si(OH)_3$
$CH_3(CF_2)_3O[CF(CF_3)CF(CF_3)O]_2CF(CF_3)CONH(CH_2)_3Si(OH)_3$
$CF_3(CF_2)_3(CH_2)_2Si(CH_3)(OH)_2$
$CF_3(CF_2)_5(CH_2)_2Si(CH_3)(OH)_2$
$CF_3(CH_2)_2Si(CH_3)(OH)_2$
$CF_3(CF_2)_3(CH_2)_3Si(CH_3)(OH)_2$
$CF_3(CF_2)_5(CH_2)_3Si(CH_3)(OH)_2$
$CF_3(CF_2)_7(CH_2)_3Si(CH_3)(OH)_2$
$CF_3(CF_2)_4(CF_2)_2(CH_2)_2Si(CH_3)(OH)_2$
$CF_3(CF_2)_4(CF_2)_2(CH_2)_3Si(CH_3)(OH)_2$
$CF_3(CF_2)_4(CH_2)_2O(CH_2)_3Si(CH_3)(OH)_2$
$CF_3(CF_2)_7CONH(CH_2)_2Si(CH_3)(OH)_2$
$CF_3(CF_2)_7CONH(CH_2)_3Si(CH_3)(OH)_2$
$CF_3(CF_2)_3O[CF(CF_3)CF(CF_3)O]_2CF(CF_3)CONH(CH_2)_3Si(CH_3)(OH)_2$
$CH_3(CF_2)_7(CH_2)_2Si(CH_3)(OH)_2$

These compounds can be used either alone, or in combinations of two or more different compounds.

The organic solvent used in the solution (a) and the solution (b) is preferably a hydrocarbon-based solvent, a fluorocarbon-based solvent, or a silicone-base solvent, and hydrocarbon-based solvents are particularly preferred. Solvents with a boiling point within a range from 100 to 250° C. are particularly desirable.

Specific examples of suitable solvents include hydrocarbon-based solvents such as n-hexane, cyclohexane, benzene, toluene, xylene, petroleum naphtha, solvent naphtha, petroleum ether, petroleum benzin, isoparaffin, normal paraffin, decalin, industrial gasoline, kerosene, and ligroin; fluorocarbon-based solvents, including Freon-based solvents such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, and $Cl(CF_2CFCl)_3Cl$, as well as Florinate (a product of 3M Corporation) and Afrude (a product of Asahi Glass Co., Ltd.); and silicone-based solvents such as dimethylsilicone, phenylsilicone, alkyl-modified silicone, and polyether silicone. These solvents can be used either alone, or in combinations of two or more different solvents.

There are no particular restrictions on the quantity of the metal-based surfactant in the organic solvent solution, although in order to produce a dense, monomolecular film, the quantity of the metal-based surfactant is preferably within a range from 0.1 to 30% by weight for both the solution (a) and the solution (b).

Furthermore, in those cases where the solution (a) is used, there are no particular restrictions on the quantity of the catalyst capable of interacting with the metal-based surfactant, provided the catalyst does not effect the physical properties of the formed monomolecular organic thin film, and a typical oxide-equivalent quantity is within a range from 0.001 to 1 mol, and preferably from 0.001 to 0.2 mols of the catalyst per 1 mol of the metal-based surfactant.

A method for producing an organic thin film according to the present invention involves a step of bringing a substrate into contact with the solution (a) or the solution (b) (hereafter, these two options are referred to jointly using the expression "organic solvent solution"), wherein the water content within the solution is either set or maintained within a predetermined range. By controlling the water content within the organic solvent solution within a certain range, a dense organic thin film is able to be formed rapidly on substrates formed from all manner of materials.

The water content within the organic solvent solution is determined on the basis of factors such as the substrate used, and the nature of the metal-based surfactant, the catalyst, and the organic solvent. Specifically, the content must be less than that which causes problems such as inhibition of chemical adsorption to the substrate surface, inability to produce a dense monomolecular film, a large loss in the quantity of the metal-based surfactant used, or deactivation of the catalyst, but must be large enough to enable adequate acceleration and activation of the film formation.

In those cases where the substrate is brought into contact with the solution using a dipping method, a quantity of water that is large enough to enable adequate acceleration and activation of the film formation refers to a quantity that enables the formation of a dense and uniform organic thin film across the entire surface of the substrate via a single dipping operation with a contact time of no more than 10 minutes, and preferably no more than 5 minutes. Specifically, a quantity of at least 50 ppm is preferred, a quantity within a range from 50 ppm to the saturated water content for the organic solvent, or more specifically from 50 to 1000 ppm is even more preferred, and a quantity within a range from 200 to 800 ppm is the most desirable. Provided the water content is 50 ppm or greater, formation of the organic thin film can be conducted rapidly, and provided the water content is no more than 1000 ppm, the problem of deactivation of the metal-based surfactant and the like does not arise.

The water content here refers to a measured value, obtained by a Karl Fischer method, for a solution aliquot sampled from the organic solvent solution, and there are no particular restrictions on the measurement apparatus, provided it uses this type of measurement method. In those cases where the organic solvent solution is homogenous, a solution aliquot is sampled from the homogenous solution and measured, in those cases where the organic solvent layer and the water layer form two separate layers, an aliquot is sampled from the organic solvent layer and measured, and in those cases where the water layer is dispersed within the organic solvent and is unable to be separated, an aliquot is sampled from the dispersion and measured.

There are no particular restrictions on the method for preparing the organic solvent solution containing the metal-based surfactant, the catalyst such as a metal oxide that is capable of interacting with the metal-based surfactant, and water, and specific examples include the following:

(1) a method in which water is added to an organic solvent solution containing the metal-based surfactant and the catalyst capable of interacting with the metal-based surfactant, and (2) a method in which the metal-based surfactant and the catalyst capable of interacting with the metal-based surfactant are added to an organic solvent solution containing the metal-based surfactant and water.

Furthermore, in order to suppress any rapid reaction, the added water in the method (1), and the added catalyst in the method (2), are preferably diluted with an organic solvent or the like prior to addition.

There are no particular restrictions on the quantity of the catalyst capable of interacting with the metal-based surfactant in those cases where the catalyst is a metal oxide, metal hydroxide, metal alkoxide, chelated or coordinated metal compound, partial hydrolysis product of a metal alkoxide, or a hydrolysis product obtained by treating a metal alkoxide with a two-fold or greater equivalence of water, provided the catalyst has no effect on the physical properties of the formed monomolecular organic thin film, but the use of a catalyst quantity that is typically within a range from 0.001 to 1 mol, and preferably from 0.001 to 0.2 mols, or an oxide-equivalent quantity that is typically within a range from 0.001 to 1 mol, and preferably from 0.001 to 0.2 mols, per 1 mol of the metal-based surfactant is preferred.

Furthermore, in those cases where the catalyst capable of interacting with the metal-based surfactant is an organic acid, the quantity of the catalyst is typically within a range from 0.001 to 100 mols, and preferably from 0.001 to 10 mols, per 1 mol of the metal-based surfactant. By using a quantity of the catalyst capable of interacting with the metal-based surfactant that falls within this range, a dense monomolecular organic thin film with no impurities can be formed rapidly.

An organic thin film forming solution of the present invention can be obtained by stirring the mixture of the aforementioned metal-based surfactant, organic solvent, and the catalyst capable of interacting with the metal-based surfactant. The stirring temperature is typically within a range from $-100°$ C. to $+100°$ C., and is preferably from $-20°$ C. to $+50°$ C. The stirring time is typically within a range from several minutes to several hours. Furthermore, in this case, ultrasound treatment is preferably used to enable a uniform organic thin film forming solution to be obtained.

In some cases, a precipitate containing metal oxide or the like may develop in the prepared organic thin film forming solution, and impurities such as these precipitated substances are preferably removed at this point to ensure a dense monomolecular organic thin film with no impurities. Precipitates can be removed easily by an operation such as filtration or decantation.

In the present invention, during the step of bringing the substrate into contact with the above solution, the water content within the organic solvent solution is maintained within a predetermined range, and the same solution is preferably used to conduct two or more repetitions of the contact step.

The expression "predetermined range" refers to the same predetermined range for the water content described above, and by maintaining the water content within that range, a dense and uniform organic thin film can be formed even when a plurality of repetitions of the contact step are conducted without changing the solution. By using the same solution and conducting a single contact step for two or more substrates, dense and uniform organic thin films can be formed across the entire contact surface in a comparatively short contact time.

The expression, "the same solution" excludes those cases where following a single repetition of the contact step, either all, or a portion of the solution is discarded and replaced with fresh solution, but as described below, includes those cases where some form of method is used to maintain the water content of the solution within the predetermined range.

Specific examples of methods for setting or maintaining the water content within the predetermined range include the following:

(1) a method in which a water layer is provided that contacts the organic solvent solution, (2) a method in which a water-retentive material in a hydrated state is incorporated within the organic solvent solution, (3) a method in which a gas containing moisture is brought into contact with the organic solvent solution, and (4) a method in which water is added appropriately.

These methods can be used either alone, or in combinations of two or more different methods.

There are no particular restrictions on the water used, provided it is neutral, although the use of pure water or distilled water is preferred. Furthermore, the organic solvent may be either anhydrous, or may already contain a certain quantity of water.

In the method (1) described above, in those cases where an organic solvent is used that separates from the water layer, such as a hydrocarbon-based solvent, the water layer may either coexist in a separated state from the organic solvent layer, or the organic solvent may be circulated or fed through the water layer before forming a separate organic solvent layer.

In those cases where an organic solvent such as a lower alcohol is used, which does not separate from water but rather exhibits a high solubility for water, a method can be used in which the organic solvent solution and the water layer are brought into contact via a membrane or the like that is permeable to water but impermeable to the organic solvent.

In the method (2) described above, the water-retentive material is preferably a material that does not cause the water to separate out within the organic solvent solution, and does not float within the organic solvent solution.

Specific examples of suitable materials include organic-based water-retentive materials such as water-absorbing polymers; inorganic water-retentive materials such as zeolites, clay silicates, vermiculites, and porous ceramics; as well as compounds such as surfactants that are capable of forming micelle molecules around a water nucleus within a solution, and of these, glass fiber filters are particularly desirable for the reason that contamination by dirt and impurities can be avoided.

Furthermore, compounds capable of forming micelle molecules around a water nucleus within a solution, and more specifically surfactants and the like, can be used as the water-retentive material, and these materials preferably coexist within the solution in a hydrated state.

Furthermore, a method in which a hydrophilic solvent is used to improve the solubility of water in the organic solvent is also possible. The hydrophilic solvent used in such a case can be incorporated as a material capable of retaining water.

There are no particular restrictions on the quantity of water incorporated within the water-retentive material, although a quantity of water that does not cause the water to separate from the water-retentive material in the organic solvent solution is preferred. Furthermore, water can simply be added and incorporated within a material capable of retaining the water. Furthermore, by providing the water-retentive material either at the interface between the solution and the external atmosphere, or in continuous arrangement from the external atmosphere through into the solution, the water content within the solution can be replenished by absorbing moisture from the humidity within the external atmosphere.

In the method (3) described above, there are no particular restrictions on the gas used, provided it has no effect on the components within the solution, and examples of suitable gases include air, nitrogen gas, and argon gas.

Examples of suitable methods for obtaining a gas containing moisture include methods in which moisture is incorporated within the gas, and methods in which the gas is humidified.

Examples of methods for incorporating moisture within the gas include methods in which the gas is immersed within water; methods of bringing water and gas into contact, such as bringing the gas into contact with the surface of water or hot water; and methods in which a gas containing water vapor is used as is.

Examples of methods for humidifying gases include steam humidification methods, water injection humidification methods, and vaporization heating methods.

Examples of methods for bringing a gas containing moisture and the organic solvent solution into contact include methods for blowing the moisture-containing gas either into the organic solvent solution or onto the surface of the organic solvent solution; methods in which the organic solvent solution is left to stand, if necessary while being stirred, in an atmosphere of the moisture-containing gas; and methods in which the organic solvent solution is left to stand, if necessary while being stirred, in a humid atmosphere. In the methods for blowing the moisture-containing gas, a blowing apparatus, a cleaning apparatus, and a filtration apparatus and the like may also be used if required.

Furthermore, specific examples of the method (4) described above include methods in which decreases in the water content within the organic solvent solution are observed, and an equivalent quantity of either water, or water that has been diluted with a co-soluble organic solvent or the same organic solvent as the organic solvent solution is then added; and methods in which an organic solvent solution containing a certain quantity of water is supplied to the solution.

There are no particular restrictions on the substrate used in the method for producing an organic thin film according to the present invention, although substrates with surfaces that include functional groups capable of interacting with the molecules in the organic solvent solution that form the organic thin film are preferred, and substrates that include active hydrogen at the surface are particularly desirable. By using a substrate that includes active hydrogen at the surface, the active hydrogen at the substrate surface and the molecules within the organic solvent solution can undergo a chemical interaction, thereby enabling ready formation of a chemically adsorbed film on the substrate surface.

An active hydrogen refers to a hydrogen that readily dissociates as a proton, and examples of functional groups containing an active hydrogen include hydroxyl groups (—OH), carboxyl groups (—COOH), formyl groups (—CHO), imino groups (=NH), amino groups (—$NH_2$), and thiol groups (—SH). Of these, hydroxyl groups are preferred.

Specific examples of substrates that have hydroxyl groups on the substrate surface include metals such as aluminum, copper, and stainless steel, glass, silicon wafers, ceramics, plastics, paper, natural and synthetic fibers, leather, and other hydrophilic materials. Of these, substrates formed from metals, glass, silicon wafers, ceramics, and plastics are preferred.

In the case of substrates formed from materials such as plastics or synthetic fibers that do not have hydroxyl groups at the surface, hydrophilic groups can be introduced by pretreating the surface of the substrate in a plasma atmosphere containing oxygen (for example for 20 minutes at 100 W), or by subjecting the substrate surface to corona treatment. Substrates formed from polyamide resins or polyurethane resin or the like have imino groups at the surface, and the active hydrogen atoms of these imino groups, and the alkoxysilyl groups or the like of the metal-based surfactant can undergo a dealcoholization reaction, thereby forming siloxane linkages (—SiO—), meaning the substrates do not require any particular surface treatment.

Furthermore, in those cases where a substrate that has no active hydrogen atoms at the surface is used, the surface of the substrate can first be brought into contact with at least one compound selected from a group consisting of $SiCl_4$, $SiHCl_3$, $SiH_2Cl_2$, and $Cl-(SiCl_2O)_b-SiCl_3$ (wherein, b represents a natural number), and a dehydrochlorination reaction then conducted, thus forming a silica base layer containing active hydrogen atoms on the surface of the substrate.

There are no particular restrictions on the method used for bringing the organic solvent solution into contact with the substrate, and conventional methods can be used. Specific examples of suitable methods include dipping methods, spin coating methods, spray methods, roller coating methods, Meyer bar methods, screen printing methods, and brush coating methods, and of these, dipping methods are preferred.

The step of bringing the organic solvent solution into contact with the substrate may involve a single contact for a longer period, or a plurality of repetitions of a shorter contact period. Ultrasound may also be used to promote film formation.

There are no particular restrictions on the temperature at which the contact occurs, provided the temperature is within a range that enables the stability of the solution to be maintained, although typically, the temperature is within a range from room temperature to the reflux temperature of the solvent used in preparing the solution. In order to ensure a favorable temperature for the contact, the solution may either be heated, or the substrate itself may be heated.

The step of bringing the substrate into contact with the organic solvent solution is preferably a step in which the substrate is immersed (dipped) in the organic solvent solution. Specific examples of methods of immersing the substrate while maintaining the water content within the organic solvent solution include the following:

(a) a method which provides a water content adjustment tank and a substrate immersion tank, wherein the solution for which the water content has been adjusted in the water content adjustment tank is circulated through the substrate immersion tank, (b) a method which provides a plurality of substrate immersion tanks, wherein while the substrate is being immersed in one of the substrate immersion tanks, the water content within the other substrate immersion tank or tanks is adjusted, and (c) a method in which a device for maintaining the aforementioned water content within a predetermined range is provided in direct contact with the substrate immersion tank, thereby enabling appropriate replenishing of the water content.

A step (B) of washing the substrate surface may be provided following completion of the step of bringing the substrate into contact with the organic solvent solution, for the purpose of removing excess reagents or impurities adhered to the substrate surface. By providing a washing step, the film thickness can be controlled.

There are no particular restrictions on the washing method employed, provided the method is capable of removing adherends from the substrate surface, and specific examples of suitable methods include methods in which the substrate is immersed in a solvent capable of dissolving the metal-based surfactant; methods in which the substrate is allowed to stand, either under vacuum or in a normal pressure atmosphere, to allow evaporation to proceed, and methods in which an inert gas such as dry nitrogen gas is used to blow any residue off the substrate surface.

Furthermore, a step (C) of heating the substrate may also be provided following the step of bringing the substrate into contact with the organic solvent solution, for the purpose of stabilizing the film formed on the surface of the substrate.

This step (C) of heating the substrate is preferably provided after the aforementioned washing step (B). The heating temperature can be selected in accordance with factors such as the stability of the substrate and the film.

In the present invention, the step of bringing the substrate into contact with the organic solvent solution is preferably conducted in a space that is maintained at a humidity of at least 40% RH, and conducting the step within a space that is maintained at a humidity of at least 60% RH is even more desirable. In this type of space, the water content within the organic solvent solution can be maintained more favorably, meaning even if substrates are continuously brought into contact with the solution, dense monomolecular films can still be formed with good reproducibility.

The method for producing an organic thin film according to the present invention can be used either for the production of a monomolecular film, or for the production of a multilayer film of two or more layers, but is particularly suited to the production of monomolecular films. Furthermore, this method can also be used as a method of forming a film on a surface by physical adsorption.

An example of a suitable method for storing the solution used in the method for producing an organic thin film according to the present invention involves treating the organic solvent solution containing either ($\alpha$) a metal-based surfactant having at least one hydrolyzable group, and a catalyst capable of interacting with the metal-based surfactant, or ($\beta$) a metal-based surfactant having at least one hydroxyl group, with water, thereby setting the water content within the organic solvent solution to a value within a predetermined range, and then maintaining the water content within the organic solvent solution within that predetermined range while the solution is sealed inside a vessel. Examples of suitable methods for setting the water content within the organic solvent solution to a value within a predetermined range, and then maintaining the water content within the organic solvent solution within that predetermined range include the same methods as those described above.

Sealing the solution inside a vessel prevents any volatilization of the water content, together with the organic solvent, on contact with the atmosphere. The water content within the organic thin film-forming solution of the present invention effects the organic thin film forming ability of the solution, and consequently the water content within the solution is preferably maintained within a predetermined range, even during storage.

By using the method for producing an organic thin film described above, monomolecular films, self-assembly films, chemically adsorbed films, and films combining all of these properties can be obtained.

2) Self-Assembly Film Forming Solution

In a self-assembly film forming solution of the present invention, the molecules for forming the self-assembly film form an aggregate within the solution.

In an organic solvent solution in which the water content is set within a predetermined range (hereafter referred to as the "organic thin film forming solution"), in those cases where the molecules for forming the organic thin film form an aggregate within the solution, the resulting organic thin film is a self-assembly film (and in these cases, the organic thin film forming solution is called a "self-assembly film forming solution").

In the aforementioned formula (IV), with the exception that the group $X^1$ represents a hydroxyl group or a hydrolyzable group, $R^{11}$, $M^1$, $n_1$, and $m_1$ have the same meanings as $R^1$, M, n, and m respectively within the aforementioned formula (I).

Furthermore, in the aforementioned formula (V), with the exception that the group $X^2$ represents a hydroxyl group or a hydrolyzable group, $R^{21}$, $R^{31}$, $R^{41}$, $M^2$, $Y^2$, $p_1$, $q_1$, $m_2$, and $r^2$ have the same meanings as $R^2$, $R^3$, $R^4$, M, Y, p, q, m, and r respectively within the aforementioned formula (II).

Specific examples of the compounds represented by the formula (IV) or the formula (V) include those compounds listed in relation to the aforementioned formula (I) and formula (II).

$X^1$ and $X^2$ need not necessarily include hydrolyzable groups, and hydroxyl group-containing compounds such as those represented by the aforementioned formula (III) are also suitable.

In the present invention, a self-assembly film refers to a film that forms with a regular structure without any external compelling forces. In a self-assembly film forming solution, the molecules of the metal-based surfactant are not solvated by the solvent, meaning that rather than existing in isolation, they group together, forming an aggregate.

In those cases where a metal-based surfactant having at least one hydrolyzable group is used as the metal-based surfactant, the aggregate is obtained through treatment of the metal-based surfactant with the catalyst capable of interacting with the metal-based surfactant, and water, whereas in those cases where a metal-based surfactant having at least one hydroxyl group is used as the metal-based surfactant, the aggregate is obtained through treatment of the metal-based surfactant with water.

Examples of suitable configurations for the aggregate include configurations in which the molecules are aggregated together via intermolecular forces, coordination bonding, or hydrogen bonding between hydrophobic portions or hydrophilic portions within the molecules; configurations in which the molecules that form the film are bonded together via covalent bonds; configurations in which micelles or the like are formed either around, or via, another medium such as water that acts as a nucleus or an mediate; and configurations that employ a combination of the above.

There are no particular restrictions on the shape of the aggregate, and spherical, chain-like, or band-like shapes are all suitable. There are no particular restrictions on the average particle diameter of the aggregate, although diameters within a range from 10 to 1,000 nm are preferred.

Furthermore, the value of the zeta potential (the interface electrokinetic voltage) of the aggregate is preferably greater than the zeta potential of the substrate within the same solution. Cases in which the zeta potential of the aggregate is positive and the zeta potential of the substrate is negative are particularly desirable. By using a self-assembly film forming solution that forms an aggregate with this type of zeta potential, a dense monomolecular film that exhibits crystallinity can be produced.

3) Chemically Adsorbed Film

A chemically adsorbed film of the present invention is a chemically adsorbed film formed on top of a substrate, wherein the substrate is not crystalline, and the chemically adsorbed film is crystalline. In other words, the film is crystalline regardless of whether or not the substrate exhibits crystallinity. In this case, the term "crystalline" includes both polycrystals and single crystals.

4) Method for Producing Monomolecular Film

A method for producing a monomolecular film according to the present invention is a method that includes a step in which a solution containing a metal-based surfactant is applied to the surface of a substrate using at least one method selected from a group consisting of dipping methods, spin coating methods, roll coating methods, Meyer bar methods, screen printing methods, offset printing methods, brush coating methods, and spray methods, and in that step, a solution containing a metal-based surfactant having a hydrocarbonoxy group or acyloxy group as a hydrolyzable group is dripped onto the substrate, and pressure is then applied from above the dripped solution to spread the solution across the substrate. There are no particular restrictions on the quantity of solution dripped onto the substrate, or the location in which the solution is dripped, and these factors can be selected in accordance with the desired location and surface area for the monomolecular film to be formed.

There are no particular restrictions on the method used for applying pressure from above the dripped solution, provided the method enables the dripped solution to be spread across the surface of the substrate, and specific examples of suitable methods include methods in which a film, a sheet, or a flat plate is laid on top of the substrate surface and pressure is then applied using a roller.

The solvent solution containing the metal-based surfactant preferably also contains a catalyst capable of activating the hydrolyzable group of the metal-based surfactant.

BEST MODE FOR CARRYING OUT THE INVENTION

Figure 1:
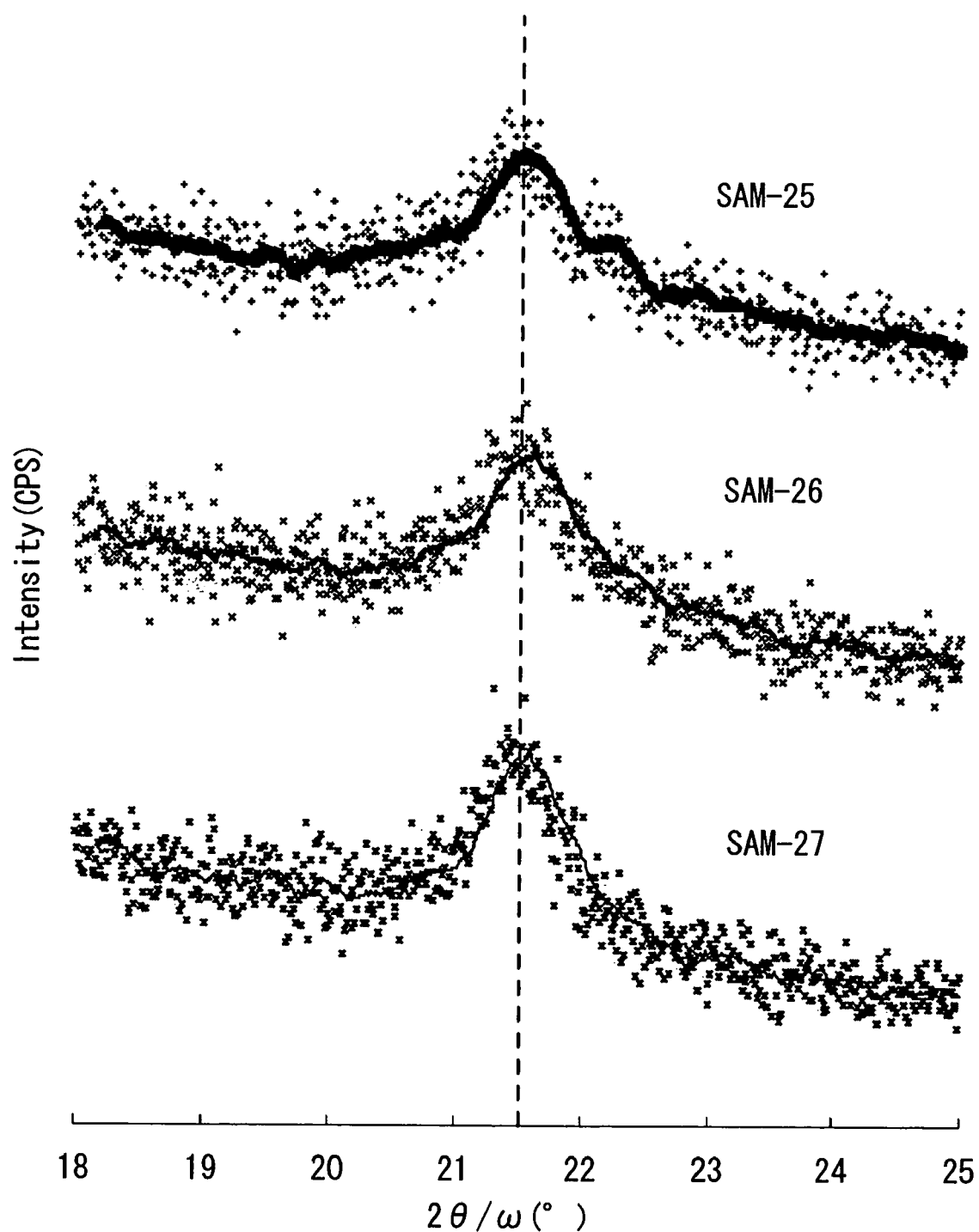
FIG. 1 shows thin-film X-ray crystal diffraction diagrams for organic thin films SAM-25 to SAM-27.

As follows is a more detailed description of the present invention using a series of examples, although the scope of the present invention is in no way restricted by the following examples.

EXAMPLE 1

(1) Catalyst Preparation-1

12.4 g of titanium tetraisopropoxide (A-1, purity: 99%, titanium oxide-equivalent concentration: 28.2% by weight, manufactured by Nippon Soda Co., Ltd.) was dissolved in 45.0 g of toluene in a four neck flask, and following replacement of the air inside the flask with nitrogen gas, the temperature was cooled to −80° C. in an ethanol/liquid nitrogen bath. In a separate vessel, 1.26 g of ion exchange water ($H_2O$/Ti=1.6 (molar ratio)) was mixed with 11.3 g of isopropanol, cooled to a temperature of −80 to −70° C., and then added dropwise to the above four neck flask with constant stirring. During the dropwise addition, the liquid temperature inside the flask was maintained at −80 to −70° C. Following completion of the dropwise addition, the resulting mixture was stirred for 30 minutes under continued cooling, and the temperature was then raised to room temperature with constant stirring, yielding a colorless and transparent partially hydrolyzed solution (C-1) with a titanium oxide-equivalent concentration of 5% by weight.

(2) Catalyst Preparation-2

In a four neck flask in which the air had been replaced with nitrogen gas, 530 g of titanium tetraisopropoxide (A-1, purity: 99%, titanium oxide-equivalent concentration: 28.2% by weight, manufactured by Nippon Soda Co., Ltd.) was dissolved in 1960 g of toluene, and the temperature was cooled to −15° C. in an ethanol/dry ice bath. In a separate vessel, 30.4 g of ion exchange water (molar ration ($H_2O$/Ti)= 0.9) was mixed with 274 g of isopropanol, and then added dropwise to the above four neck flask with constant stirring over a 90 minute period. During the dropwise addition, the liquid temperature inside the flask was maintained at −15 to −10° C. Following completion of the dropwise addition, the resulting mixture was stirred for 30 minutes at −10° C., the temperature was raised to room temperature, and the stirring was continued for a further 1 hour, yielding a colorless, transparent solution. This solution was cooled to −80° C. in an ethanol/dry ice bath, and a mixed solution of 20.3 g of ion exchange water ($H_2O$/Ti)=0.6) and 183 g of isopropanol was added dropwise with constant stirring over a 90 minute period. Following completion of the dropwise addition, the temperature was slowly returned to room temperature over a three hour period, and the solution was then refluxed for two hours at a temperature of 90 to 100° C., yielding a colorless and transparent partially hydrolyzed solution (C-2) with a titanium oxide-equivalent concentration of 5% by weight. This solution was a sharp monodispersed sol with an average particle diameter of 5.6 nm.

(3) Catalyst Preparation-3

17.79 g (62.6 mmol) of titanium tetraisopropoxide (A-1, purity: 99%, titanium oxide-equivalent concentration: 28% by weight, manufactured by Nippon Soda Co., Ltd.) and 65.31 g of anhydrous toluene were mixed together in flask under a nitrogen gas atmosphere at a liquid temperature of 18° C., yielding a solution. A mixture of 1.69 g of water (93.9 mmol, $H_2O$/Ti=1.5 (molar ratio)), 30.42 g of anhydrous isopropanol, and 30.42 g of anhydrous toluene (the water concentration was equivalent to the 22% that represents the saturated solubility of water in an isopropanol-toluene mixed solvent), was then added to the solution in a dropwise manner with constant stirring over two hours, with the liquid temperature maintained at 18 to 20° C., thus yielding a pale yellow, transparent solution. When the solution was then stirred for a further 1.5 hours at 18° C., the yellow color darkened slightly, but when the solution was then refluxed for 2.5 hours, a colorless, transparent solution was obtained. The oxide concentration of the solution was 3.4% by weight. Toluene was then added to this solution to dilute the oxide concentration to 1.0% by weight, thus completing preparation of a catalyst (C-3).

(4) Catalyst Preparation-4

A silica sol dispersed in isopropanol (IPA) (IPA-ST-S, 25% by weight, manufactured by Nissan Chemical Industries, Ltd.) was dispersed in anhydrous toluene, thus yielding a dispersion (C-4) with a silica equivalent concentration of 1% by weight.

(5) Catalyst Preparation-5

12.4 g of titanium tetraisopropoxide (A-1, purity: 99%, titanium oxide-equivalent concentration: 28.2% by weight, manufactured by Nippon Soda Co., Ltd.) was dissolved in 45.0 g of toluene in a four neck flask, and following replacement of the air inside the flask with nitrogen gas, the temperature was cooled to −20° C. in an ethanol/dry ice bath. In a separate vessel, 1.26 g of ion exchange water ($H_2O$/Ti=1.6 (molar ratio)) was mixed with 11.3 g of isopropanol, cooled to a temperature of −20° C., and then added dropwise to the above four neck flask with constant stirring. During the dropwise addition, the liquid temperature inside the flask was maintained at −20° C. Following completion of the dropwise addition, the resulting mixture was stirred for 30 minutes under continued cooling, and the temperature was then raised to room temperature with constant stirring, yielding a colorless and transparent partially hydrolyzed solution (C-5) with a titanium oxide-equivalent concentration of 5% by weight.

(6) Catalyst Preparation-6

Tetrakis(trimethylsiloxy)titanium (manufactured by Gelest Inc.) was dissolved in anhydrous toluene, yielding a catalyst solution (C-6) with a concentration of 1% by weight.

(7) Catalyst Preparation-7

With the exception of adding the ion exchange water dropwise at −40° C., a partially hydrolyzed solution (C-7) was prepared in the same manner as the catalyst preparation-1.

(8) Metal-based Surfactant-1

The material M-1 described below was used as the metal-based surfactant for preparing an organic thin film forming solution.

M-1: n-octadecyltrimethoxysilane (ODS), manufactured by Gelest Inc.

(9) Metal-Based Surfactant-2

Using the method described below, M-2: n-octadecyltrihydroxysilane (ODHS) was prepared as the metal-based surfactant for preparing an organic thin film forming solution.

A four neck flask in which the air had been replaced with nitrogen gas was charged with 82 g of anhydrous ethanol, 0.6 g of 0.1 N hydrochloric acid, and 9 g of water, and the mixture was cooled to 0° C. Subsequently, with the mixture inside the flask undergoing constant stirring, 7.8 g of octadecyltriethoxysilane was added dropwise. Following completion of this dropwise addition, the reaction mixture was held at room temperature for three hours. The reaction liquid was then filtered off, and the solid was dried under vacuum at room temperature for two hours, yielding 4.4 g of a white powder (M-2) (yield: 72%).

(10) Organic Thin Film Forming Solution Preparation Method-1

Ion exchange water was added to anhydrous toluene and stirred briskly, yielding the hydrous toluene shown in Table 1. The metal-based surfactant M-1 was added to this hydrous toluene in sufficient quantity to yield a final concentration of 0.5% by weight, and the mixture was stirred at room temperature for 30 minutes. Subsequently, one of the catalysts C-1 to C-4 was added dropwise to the solution in the predetermined quantity shown in Table 1, and following completion of the dropwise addition, the mixture was stirred at room temperature for three hours, yielding a solution (SA-1 through SA-10).

(11) Organic Thin Film Forming Solution Preparation Method-2

The metal-based surfactant M-1 was added to hydrous toluene with a water content of 350 ppm, in sufficient quantity to yield a final concentration of 0.5% by weight, and the mixture was then stirred at room temperature for 30 minutes. Subsequently, one of the catalysts C-1 to C-4 was added dropwise to the solution in a predetermined quantity, and following completion of the dropwise addition, the mixture was stirred at room temperature for three hours. A 100 g sample of each of the thus formed solutions was transferred to a bottle, a glass fiber filter paper of diameter 3 cm (GA-100, manufactured by Toyo Roshi Co., Ltd.) that had been thoroughly wet with water was immersed at the bottom of the bottle, and the bottle was sealed. The bottle was then allowed to stand at room temperature for two hours, yielding a solution (SA-11 through SA-14).

(12) Organic Thin Film Forming Solution Preparation Method-3

The metal-based surfactant M-1 was added to hydrous toluene with a water content of 350 ppm, in sufficient quantity to yield a final concentration of 0.5% by weight, and the mixture was then stirred at room temperature for 30 minutes. Subsequently, one of the catalysts C-1 to C-7 was added dropwise to the solution in a predetermined quantity, and following completion of the dropwise addition, the mixture was stirred at room temperature for three hours. A 100 g sample of each of the thus formed solutions was transferred to a bottle, and using an 18 L/minute blower and a Kinoshita glass ball filter, saturated water vapor was bubbled through the solution at 25° C., yielding a solution (SA-15 through SA-18, SA-22 through SA-25) with an adjusted moisture content.

(13) Organic Thin Film Forming Solution Preparation Method-4

Ion exchange water was added to anhydrous toluene and stirred briskly, yielding a hydrous toluene with a water content of 100 ppm. The metal-based surfactant M-1 was added to this hydrous toluene in sufficient quantity to yield a final concentration of 0.5% by weight, and the mixture was stirred at room temperature for 30 minutes. Subsequently, the catalyst C-3 was added dropwise to the solution in the predetermined quantity shown in Table 1, and following completion of the dropwise addition, the mixture was stirred at room temperature for three hours. A 100 g sample of each of the thus formed solutions was transferred to a bottle, 10 g of ion exchange water was added, the bottle was sealed, and the mixture was then agitated for 5 minutes at 25° C., gently enough to avoid emulsification, thus yielding a solution with a saturated water content (SA-19 and SA-20). Following agitation, the water separated and formed a water layer.

(14) Organic Thin Film Forming Solution Preparation Method-5

Using the method described above in the organic thin film forming solution preparation method-3 (and using the catalyst C-3), toluene with an unknown water content was used, and by adjusting the bubbling time, a solution with a water content of 250 ppm (SA-21) was obtained.

(15) Organic Thin Film Forming Solution Preparation Method-6

The metal-based surfactant M-2 was added to tetrahydrofuran (THF) with a water content of 400 ppm, in sufficient quantity to yield a final concentration of 0.5% by weight, and the mixture was then stirred at room temperature for three hours. A 100 g sample of the thus formed solution was transferred to a bottle, a glass fiber filter paper of diameter 3 cm (GA-100, manufactured by Toyo Roshi Co., Ltd.) that had been thoroughly wet with water was immersed at the bottom of the bottle, and the bottle was sealed. The bottle was then allowed to stand at room temperature for two hours, yielding a solution (SA-26).

(16) Organic Thin Film Forming Solution Preparation Method-7

Comparative organic thin film forming solutions (R-1 through R-6) were prepared in the manner described below.

R-1: With the exception of not adding the ion exchange water, a solution was prepared in the same manner as the organic thin film forming solution preparation method-1.

R-2 to R-4: Ion exchange water was added to anhydrous toluene and stirred briskly, yielding hydrous toluene with a water content of 100, 210, and 94 ppm respectively. The metal-based surfactant M-1 was then added to the solution in sufficient quantity to yield a final concentration of 0.5% by weight, and the mixture was stirred at room temperature for 30 minutes. Subsequently, a predetermined quantity of the catalyst C-2 was added dropwise to the solution, and following completion of the dropwise addition, the mixture was stirred at room temperature for three hours, completing the preparation.

R-5: With the exception of not adding the catalyst, a solution was prepared in the same manner as the organic thin film forming solution preparation method-1.

R-6: The metal-based surfactant M-1 was dissolved in anhydrous toluene, and following stirring at room temperature for 30 minutes, the catalyst C-5 was added dropwise, and the resulting mixture was then stirred at room temperature for three hours to complete the preparation.

(17) Evaluation of Organic Thin Film Forming Solutions

The water content within each solvent or solution, the average particle diameter, and the zeta potential were measured using the methods described below. The results are summarized in Table 1.

In Table 1, the value for the water content prior to treatment refers to the water content within the toluene for SA-1 to SA-10, and R-1 to R-6, to the water content of the solution prior to insertion of the glass fiber filter paper for SA-11 to SA-14, to the water content within the solution prior to bubbling for SA-15 to SA-18, and SA-22 to SA-25, and to the water content within the solution prior to addition of the water for SA-19 and SA-20.

<Water Content>

The water content was measured using a Karl Fischer moisture meter (CA-07, manufactured by Dia Instruments Co., Ltd.) using a coulometric titration method.

<Average Particle Diameter>

The average particle diameter was measured using a dynamic light scattering particle diameter measurement apparatus (HPPS, manufactured by Malvern Instruments Ltd.).

<Zeta Potential>

The zeta potential was measured using a laser zeta potential meter (ELS-8000, manufactured by Otsuka Electronics Co., Ltd.).

TABLE 1

| Organic thin film forming solution | Catalyst (C) | Mixing ratio* between M-1 and C | Water content prior to treatment (ppm) | Water content within solution (ppm) | Average particle diameter of particles within solution | Zeta potential |
|---|---|---|---|---|---|---|
| SA-1 | C-1 | 95:5 | 1000 | 520 | — | — |
| SA-2 | C-1 | 90:10 | 800 | 480 | — | — |

TABLE 1-continued

| Organic thin film forming solution | Catalyst (C) | Mixing ratio* between M-1 and C | Water content prior to treatment (ppm) | Water content within solution (ppm) | Average particle diameter of particles within solution | Zeta potential |
|---|---|---|---|---|---|---|
| SA-3 | C-2 | 99:1 | 700 | 510 | — | — |
| SA-4 | C-2 | 90:10 | 1000 | 485 | — | — |
| SA-5 | C-2 | 60:40 | 1000 | 380 | — | — |
| SA-6 | C-3 | 95:5 | 800 | 450 | — | — |
| SA-7 | C-3 | 90:10 | 1000 | 480 | — | — |
| SA-8 | C-4 | 90:10 | 1000 | 390 | — | — |
| SA-9 | C-2 | 90:10 | 450 | 140 | — | — |
| SA-10 | C-2 | 90:10 | 320 | 107 | — | — |
| SA-11 | C-1 | 90:10 | 145 | 550 | — | — |
| SA-12 | C-2 | 90:10 | 150 | 560 | — | — |
| SA-13 | C-3 | 90:10 | 132 | 580 | — | — |
| SA-14 | C-4 | 90:10 | 110 | 560 | — | — |
| SA-15 | C-1 | 90:10 | 145 | 570 | — | — |
| SA-16 | C-2 | 90:10 | 150 | 580 | — | — |
| SA-17 | C-3 | 90:10 | 132 | 580 | — | — |
| SA-18 | C-4 | 90:10 | 110 | 570 | — | — |
| SA-19 | C-3 | 95:5 | 110 | 540 | — | — |
| SA-20 | C-3 | 90:10 | 110 | 530 | — | — |
| SA-21 | C-3 | 90:10 | — | 250 | — | — |
| SA-22 | C-7 | 90:10 | 240 | 467 | — | — |
| SA-23 | C-5 | 90:10 | 250 | 520 | 42 nm | +47 mV |
| SA-24 | C-5 | 50:50 | 220 | 490 | 23 nm | +53 mV |
| SA-25 | C-6 | 98:2 | 230 | 510 | 150 nm | +116 mV |
| SA-26 | — | — | — | 410 | — | — |
| R-1 | C-2 | 90:10 | 7 | 12 | — | — |
| R-2 | C-2 | 90:10 | 100 | 35 | — | — |
| R-3 | C-2 | 90:10 | 210 | 82 | — | — |
| R-4 | C-2 | 90:10 | 94 | 40 | — | — |
| R-5 | — | — | 350 | 510 | Measurement impossible | 0 mV |
| R-6 | C-5 | 90:10 | 3 | 2 | Measurement impossible | 0 mV |

*(number of mols of M-1):(metal oxide-equivalent number of mols of metal component within C solution)

From Table 1 it is evident that in the solutions SA-1 through SA-10, the water content within the toluene decreases to approximately half of the initial value on preparation of the organic thin film forming solution. The reason for this decrease remains unclear, but it may represent adhesion to the walls of the vessel or volatilization into the atmosphere.

From the results for the solutions SA-11 to SA-21 it is clear that by using a method in which water is added after solution preparation, a method in which a water-soaked glass fiber filter paper is placed in the solution, or a method in which water vapor is blown through the solution, the water content within the solution can be increased. This finding suggests that even for an organic thin film forming solution in which the water content has fallen for some reason, a water content that exceeds a predetermined quantity can be obtained by employing a device for maintaining the water content, and consequently even in those cases where a solution that has been stored is used, the stored solution can be used as the organic thin film forming solution without having to readjust the water content within the solution.

From the results for SA-23 through SA-25 in Table 1 it is clear that whereas the external appearance of the prepared solution is transparent, particles have been formed within the solution. Furthermore, these particles are formed by addition of the water and the catalyst. From these results it is inferred that the metal-based surfactant M-1 is undergoing some form of interaction with the water and the catalyst, thereby forming an aggregate.

These prepared solutions displayed positive zeta potentials. When the zeta potential value for possible substrates including soda lime glass, alkali-free glass substrates,and a silicon wafer was measured in the same solutions, the results were −42 mV, −69 mV, and −35 mV respectively, smaller values than the zeta potential of the solution in each case. The zeta potential of the solution in the case where water and the catalyst were not added was 0 mV.

(18) Organic Thin Film Formation-1

Soda lime glass substrates (SLG), alkali-free glass substrates (AN100, manufactured by Asahi Glass Co., Ltd.), silicon wafers (Si), and stainless steel substrates (SUS316, SUS304) that had been subjected to ultrasound cleaning and ozone cleaning were immersed in the aforementioned solutions (SA-1 through SA-26, and R-1 through R-6) for the predetermined time periods shown in Table 2, subsequently removed from the solutions, subjected to ultrasound cleaning in toluene, and then dried at 60° C. for 10 minutes, thereby forming organic thin films of M-1 (SAM-1 to SAM-31, and RL-1 to RL-6) and organic thin films of M-2 (SAM-32).

(19) Evaluation of Organic Thin Films

Measurement of the contact angle, evaluation of the film adhesiveness, measurement of the film thickness, XPS analysis, SPM analysis, and measurement of the film crystallinity for each of the obtained organic thin films were conducted using the methods described below. The results of the contact angle, film adhesiveness, and film thickness measurements are summarized in Table 2.

<Contact Angle>

The contact angle was measured by using a microsyringe to drip 5 μl of water, toluene, or tetradecane onto the surface of each sample, waiting for 60 seconds, and then measuring the contact angle using a contact angle measurement device (360S, manufactured by Erma Inc.)

<Film Adhesiveness>

The organic thin film was subjected to ultrasound cleaning for one hour in water, and the contact angle was then remeasured and compared with the value obtained prior to ultrasound cleaning. If the values were the same, the film was recorded using the symbol O, whereas if the value had fallen, the film was recorded using the symbol x.

<Film Thickness>

The film thickness of each of the obtained organic thin films was measured using a multiple angle spectroscopic ellipsometer (manufactured by J.A. Woollam Co., Inc.).

<X-ray Photoelectron Spectroscopic Analysis>

Analysis of the elements within each of the films was conducted using an X-ray photoelectron spectroscopy apparatus (an XPS apparatus, Quantum 2000, manufactured by Ulvac-Phi Inc.).

<SPM Analysis>

The formation process for each of the obtained organic thin films, and the presence of film defects were evaluated using a scanning probe microscope (SPM: SPA400, manufactured by Seiko Instruments Inc.).

<Film Crystallinity>

The crystallinity of each of the obtained organic thin films was measured using a thin-film X-ray diffraction apparatus (ATX-G, manufactured by Rigaku Corporation).

TABLE 2

| Organic thin film | Organic thin film forming solution | Substrate | Immersion time (minutes) | Film contact angle (°) Water | Toluene or tetradecane* | Film adhesiveness | Film thickness (nm) |
|---|---|---|---|---|---|---|---|
| Examples | | | | | | | |
| SAM-1 | SA-1 | SLG | 2 | 105 | 35 | O | — |
| SAM-2 | SA-1 | AN100 | 5 | 106 | 36 | O | — |
| SAM-3 | SA-1 | Si | 10 | 102 | 33 | O | — |
| SAM-4 | SA-2 | SLG | 2 | 106 | 36 | O | — |
| SAM-5 | SA-3 | AN100 | 5 | 104 | 34 | O | — |
| SAM-6 | SA-4 | Si | 10 | 105 | 32 | O | — |
| SAM-7 | SA-5 | SLG | 2 | 100 | 30 | O | — |
| SAM-8 | SA-6 | AN100 | 2 | 101 | 32 | O | — |
| SAM-9 | SA-7 | Si | 10 | 101 | 31 | O | — |
| SAM-10 | SA-8 | SLG | 5 | 100 | 30 | O | — |
| SAM-11 | SA-9 | SLG | 5 | 101 | 31 | O | — |
| SAM-12 | SA-10 | SLG | 5 | 99 | 30 | O | — |
| SAM-13 | SA-11 | SLG | 1 | 102 | 32 | O | — |
| SAM-14 | SA-12 | AN100 | 2 | 106 | 36 | O | — |
| SAM-15 | SA-13 | Si | 5 | 102 | 32 | O | — |
| SAM-16 | SA-14 | SLG | 5 | 100 | 30 | O | — |
| SAM-17 | SA-15 | SLG | 1 | 103 | 34 | O | — |
| SAM-18 | SA-16 | Si | 5 | 104 | 33 | O | — |
| SAM-19 | SA-17 | AN100 | 2 | 102 | 32 | O | — |
| SAM-20 | SA-18 | SLG | 5 | 100 | 31 | O | — |
| SAM-21 | SA-19 | Si | 5 | 100 | 30 | O | — |
| SAM-22 | SA-20 | AN100 | 2 | 107 | 35 | O | — |
| SAM-23 | SA-22 | SUS316 | 5 | 109 | 23 | O | — |
| SAM-24 | SA-22 | SUS304 | 5 | 110 | 27 | O | — |
| SAM-25 | SA-23 | SLG | 1 | 105 | 35 | O | 2.5 |
| SAM-26 | SA-23 | AN100 | 2 | 105 | 35 | O | 2.5 |
| SAM-27 | SA-23 | Si | 3 | 106 | 36 | O | 2.7 |
| SAM-28 | SA-24 | AN100 | 2 | 102 | 33 | O | 2.5 |
| SAM-29 | SA-24 | Si | 2 | 106 | 36 | O | 2.6 |
| SAM-30 | SA-25 | AN100 | 3 | 104 | 34 | O | 2.5 |
| SAM-31 | SA-25 | Si | 5 | 105 | 32 | O | 2.6 |
| SAM-32 | SA-26 | SLG | 5 | 102 | 32* | O | — |
| Comparative examples | | | | | | | |
| RL-1 | R-1 | SLG | 30 | 82 | 13 | X | — |
| RL-2 | R-2 | Si | 60 | 73 | 9 | X | — |
| RL-3 | R-3 | SLG | 5 | 92 | 26 | X | — |
| RL-4 | R-4 | SLG | 5 | 88 | 19 | X | — |
| RL-5 | R-5 | Si | 30 | 65 | 13 | X | Measurement impossible |
| RL-6 | R-6 | Si | 60 | 73 | 9 | X | Measurement impossible |

From Table 2 it is evident that at water content values of no more than 50 ppm, an organic thin film with a satisfactory contact angle cannot be obtained even after lengthy periods. From this finding it is clear that in order to obtain a dense monomolecular film, (i) a water content greater than a predetermined quantity is required, and (ii) in those cases where the water content is less than this predetermined quantity, water must be replenished using a water retention device, thereby forming a solution in which the water content is maintained at a level above the predetermined quantity.

When the films SAM-1 to SAM-24 were analyzed using XPS, a strong carbon peak, which is not from the substrate, was observed. The fact that component elements of the substrate were also confirmed at the same time, together with the measurement principles of the apparatus, suggest that the film thickness was no more than 10 nanometers, and that the in-plane distribution of the carbon was uniform. The carbon content of the films of the comparative examples RL-1 to RL-4 was less than 1/3 that observed for the examples.

Furthermore, measurement of the film thickness of the films SAM-25 to 31 revealed values substantially equal to the theoretical molecular length of the metal-based surfactant M-1 (approximately 2.3 nm), confirming that the films SAM-25 to 31 were monomolecular films.

In the comparative examples R-5 and R-6, measurement of the film thickness was impossible, confirming that a monomolecular film had not been obtained. The above results suggest that in an organic thin film forming solution, the generation of aggregate particles of the molecules that form the organic thin film, and a zeta potential for those particles that is larger than the zeta potential of the substrate on which the organic thin film is formed, are important factors in enabling a favorable organic thin film to be produced rapidly.

Furthermore, even when the metal-based surfactant M-2 was used, a favorable organic thin film SAM-32 was still able to be formed. This suggests organic thin film formation that involves the silanol groups of the metal-based surfactant having a hydroxyl group.

X-ray diffraction diagrams for the films SAM-25 to SAM-27 are shown in FIG. 1. From FIG. 1 it is clear that the organic thin films exhibit favorable crystallinity with an interplanar spacing of 4.1 Å. From the above results it is evident that the molecules that constitute the film are arrayed regularly and with a high density, confirming that a crystalline monomolecular film can be formed extremely quickly, even on an amorphous substrate such as a glass substrate.

Furthermore, in the film formation process for SAM-27 and SAM-31, the immersion time was divided into periods, and by inspecting the substrate surface after each time period using SPM, the changes during the film formation process were measured. The resulting SPM charts are shown in FIG. 2A, FIG. 2B, FIG. 2C, FIG. 2D, FIG. 3A, FIG. 3B, FIG. 3C, and FIG. 3D respectively. FIG. 2A, FIG. 2B, FIG. 2C, and FIG. 2D shows the SPM charts after immersion times of FIG. 2A; less than 1 second, FIG. 2B; 15 seconds, FIG. 2C; 30 seconds, and FIG. 2D; 1 minute, whereas FIG. 3A, FIG. 3B, FIG. 3C, and FIG. 3D show the SPM charts after immersion times of FIG. 3A; less than 1 second, FIG. 3B; 15 seconds, FIG. 3C; 1 minute, and FIG. 3D; 5 minutes.

From FIG. 2A, FIG. 2B, FIG. 2C, FIG. 2D, FIG. 3A, FIG. 3B, FIG. 3C, and FIG. 3D, it is evident that the organic thin film forms gradually on the substrate surface as the time progresses. Furthermore, FIG. 2A and FIG. 3A suggest that rather than growing in single molecule steps, the film grows in units equivalent to a single aggregate.

Figure 2A:
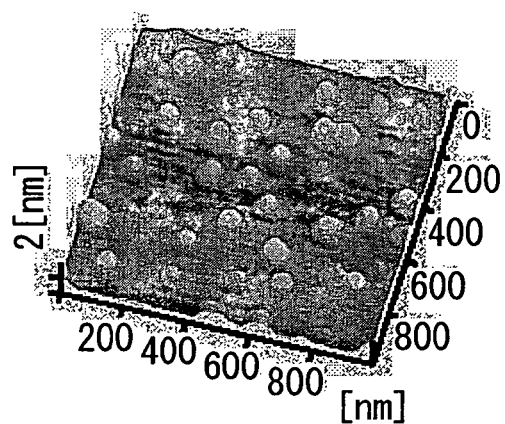
FIGS. 2A-2D show SPM charts during a process for forming SAM-27, wherein the charts represent the organic thin film obtained after immersion times of (a) less than 1 second, (b) 15 seconds, (c) 30 seconds, and (d) 1 minute.
Figure 2B:
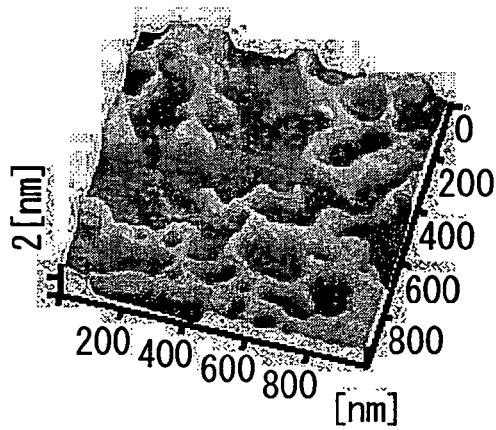
Figure 2C:
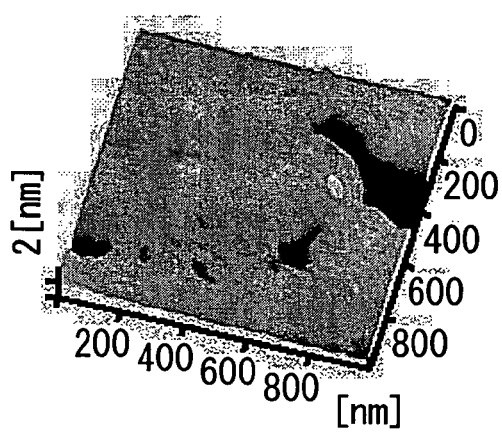
Figure 2D:
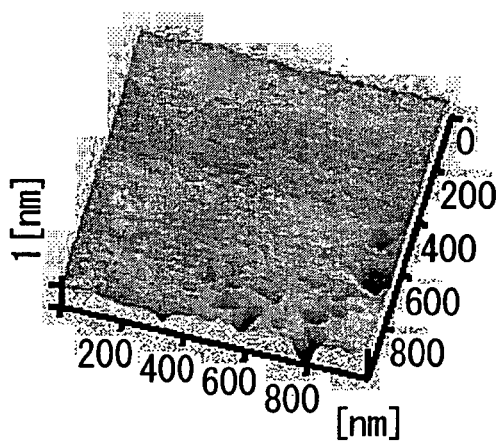
Figure 3A:
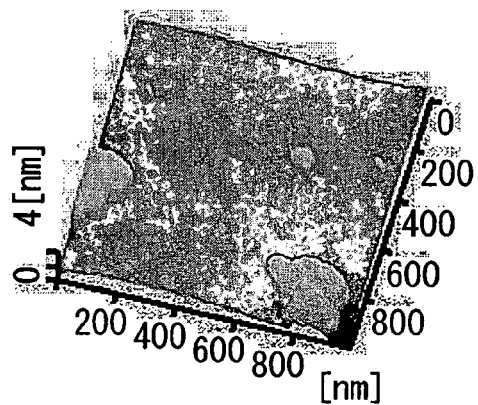
FIGS. 3A-3D show SPM charts during a process for forming SAM-31, wherein the charts represent the organic thin film obtained after immersion times of (a) less than 1 second, (b) 15 seconds, (c) 1 minute, and (d) 5 minutes.
Figure 3B:
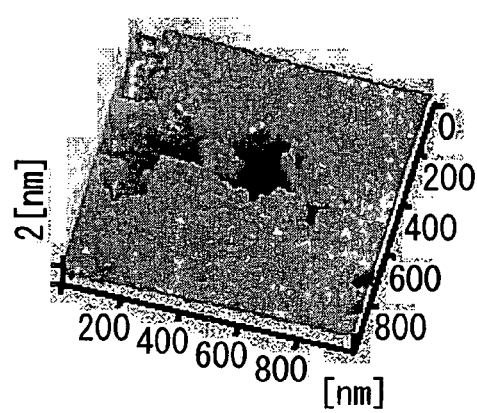
Figure 3C:
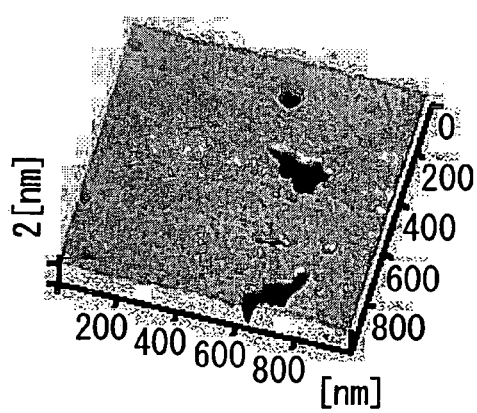
Figure 3D:
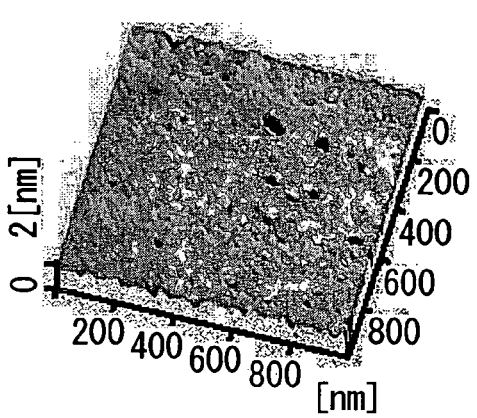

When the particle diameter of those aggregates were measured off FIG. 2A and FIG. 3A, the results were approximately 50 nm for FIG. 2A, FIG. 2B, FIG. 2C, and FIG. 2D, and approximately 200 nm for FIG. 3A, FIG. 3B, FIG. 3C, and FIG. 3D. These aggregate particle sizes show a favorable correlation with the particle surface areas calculated from the particle sizes observed within the organic thin film forming solution (SAM-27: 42 nm, SAM-31: 150 nm).

The above findings suggest that, within the organic thin film forming solution, the aggregates of the molecules that form the self-assembly film act as the growth units for the rapid growth of the dense organic thin film.

(20) Organic Thin Film Formation-2

Under conditions including a temperature of 25° C. and a humidity of 35%, 10 pieces of ozone-cleaned, rectangular, alkali-free glass substrates of dimensions 2 cm×5 cm were immersed simultaneously in 100 g of the solution SA-21, and following 5 minutes immersion, the substrates were removed, subjected to ultrasound cleaning in toluene, and then dried for 10 minutes, thus yielding organic thin films. This operation was repeated 20 times, and the water content within the solution, and the characteristics of the produced chemically adsorbed films were evaluated. Furthermore, saturated water vapor was then bubbled through the used solution to return the water content to 250 ppm, and the same operation was then repeated, yielding additional organic thin films. The results are summarized in Table 3.

TABLE 3

| Immersion repetition | 1st repetition | 5th repetition | 10th Repetition | 15th Repetition | 20th repetition | After bubbling |
|---|---|---|---|---|---|---|
| Water content (ppm) | 250 | 208 | 156 | 112 | 101 | 250 |
| Contact angle: water (°) | 107 | 95 | 92 | 86 | 83 | 108 |
| Contact angle: toluene (°) | 35 | 28 | 23 | 16 | 12 | 36 |

From Table 3 it is evident that as the number of substrate immersion repetitions is increased, the water content within the solution decreases, and the contact angle of the formed organic thin films falls. These results suggest that if the water content decreases, a dense monomolecular film cannot be formed in the same immersion time as that used for cases when the water content was higher.

(21) Organic Thin Film Formation-3

(Preparation of Organic Thin Film Forming Solution)

9.0 g of titanium tetraisopropoxide (product name: A-1, purity: 99%, titanium oxide-equivalent concentration: 28.2% by weight, manufactured by Nippon Soda Co., Ltd.) was dissolved in 91.0 g of toluene in a four neck flask, and following replacement of the air inside the flask with nitrogen gas, the temperature was cooled to −60° C. in a modified alcohol/dry ice bath. In a separate vessel, 2.0 g of ion exchange water ($H_2O/Ti=3.5$ (molar ratio)) was mixed with 98.0 g of isopropanol, cooled to a temperature of −60 to −50° C., and then added dropwise to the above four neck flask with constant stirring. During the dropwise addition, the liquid temperature inside the flask was maintained at −60 to −50° C. Following completion of the dropwise addition, the resulting mixture was stirred for 5 minutes under continued cooling, and then stirred for a further one hour at −40° C., and the temperature was then raised to room temperature, yielding a colloid solution.

Subsequently, 0.65 g of the metal-based surfactant M-1 and 1.0 g of the above colloid solution were added to 98 g of hydrous toluene (water content: 460 ppm) at room temperature, and the mixture was then immersed in an ultrasound bath for 30 minutes, thereby achieving dissolution and yielding an organic thin film forming solution (SA-101).

Furthermore, with the exception of adding 20 mg of titanic acid (titanium hydroxide, manufactured by Mitsuwa Chemicals Co., Ltd.) instead of the above colloid solution, preparation was conducted in the same manner as above, and the mixture was then immersed in an ultrasound bath for one hour, yielding a suspension. This suspension was then filtered to remove the insoluble components, thereby yielding an organic thin film forming solution (SA-102).

A four neck flask was charged with 99 g of water-saturated toluene (water content: 460 ppm), and 0.45 g of a 10% toluene solution of titanium tetraisopropoxide ($H_2O/Ti=16$ (molar ratio)) was then added dropwise at room temperature with continuous stirring, thereby yielding a colloid solution.

0.65 g of the metal-based surfactant M-1 was then added to this colloid solution at room temperature, and the mixture was then immersed in an ultrasound bath for 30 minutes, thereby achieving dissolution and yielding an organic thin film forming solution (SA-103).

(Organic Thin Film Formation, Organic Thin Film Evaluation)

Three glass slides were prepared, and these were then immersed for 5 minutes in the organic thin film forming solutions (SA-101 to SA-103) prepared above. The glass slides were then removed, the surfaces were washed with toluene, and the slides were dried for 10 minutes at 60° C., thereby yielding glass slides with an ODS organic thin film (SAM-101 to SAM-103) formed on the surfaces thereof. The thus obtained sets of three organic thin film glass slides were then subjected to the evaluation <contact angle measurement> described below.

A microsyringe was used to drip 5 μl of water or tetradecane onto the surface of samples of the three organic thin film-coated glass slides obtained above, and the slides were then left to stand for 60 seconds. Subsequently, the contact angle at the water and tetradecane drop surface was measured using a contact angle measurement device (360S, manufactured by Erma Inc.). The results are shown in Table 4. In Table 4, the units for the contact angles are degrees (°).

TABLE 4

| Organic thin film | Organic thin film forming solution | Organic thin film contact angle (°) | |
|---|---|---|---|
| | | Water | Tetradecane |
| SAM-101 | SA-101 | 106.9 | 35.6 |
| SAM-102 | SA-102 | 99.7 | 28.7 |
| SAM-103 | SA-103 | 104 | 37.2 |

From Table 4 it is clear that by immersing a glass slide for 10 minutes in an organic thin film forming solution, an organic thin film with excellent water repellency and oil repellency can be formed rapidly.

(22) Organic Thin Film Formation-4

0.65 g of the metal-based surfactant M-1 and 1.3 g of a 3.5% by weight toluene solution of titanium tetraisopropoxide were dissolved in 99 g of hydrous toluene (water content: 460 ppm), and the solution was left to age for one day. 2.0 g of distilled water was then added to this solution, and the resulting solution was left to stand for a further one day, thus yielding an organic thin film forming solution (SA-104). Subsequently, glass slides were immersed for 5 minutes in the thus prepared organic thin film forming solution (SA-104), and these glass slides were then removed, the surfaces were washed with toluene, and the slides were dried for 10 minutes at 60° C., thereby yielding glass slides with an ODS organic thin film (SAM-104) formed on the surfaces thereof.

A microsyringe was used to drip 5 μl of water or tetradecane onto the surface of sample of organic thin film-coated glass slides obtained above, and the slides were then left to stand for 60 seconds. Subsequently, the contact angle at the water and tetradecane drop surface was measured using a contact angle measurement device (360S, manufactured by Erma Inc.). The results revealed a water contact angle of 106.3° and a tetradecane contact angle of 35.8°.

(23) Organic Thin Film Formation-5

0.65 g of the metal-based surfactant M-1 and 0.3 g of titanium oleate (manufactured by Mitsuwa Chemicals Co., Ltd.) were dissolved in 99 g of hydrous toluene (water content: 460 ppm), and the solution was left to age for one day. 2.0 g of distilled water was then added to this solution, and the resulting solution was left to stand for a further one day, thus yielding an organic thin film forming solution (SA-105). Subsequently, glass slides were immersed for 5 minutes in the thus prepared organic thin film forming solution (SA-105), and these glass slides were then removed, the surfaces were washed with toluene, and the slides were dried for 10 minutes at 60° C., thereby yielding glass slides with an ODS organic thin film (SAM-105) formed on the surfaces thereof.

A microsyringe was used to drip 5 μl of water or tetradecane onto the surface of separate organic thin film-coated glass slides obtained above, and the slides were then left to stand for 60 seconds. Subsequently, the contact angle at the water and tetradecane drop surface was measured using a contact angle measurement device (360S, manufactured by Erma Inc.). The results revealed a water contact angle of 103.5° and a tetradecane contact angle of 32.2°.

(24) Organic Thin Film Formation-6

(Preparation of Titanium Complex Solution)

To samples of hydrous toluene were added 1 g of a 3.5% by weight toluene solution of titanium tetraisopropoxide, and the various coordination compounds shown in Table 5, thus yielding a series of titanium complex solutions (T-1 to T-5). The quantity used of the hydrous toluene, and the nature and quantity of each of the coordination compounds are shown in Table 5.

TABLE 5

| Titanium complex solution | Organic thin film forming solution | | |
|---|---|---|---|
| | Type | Quantity added | Hydrous toluene |
| T-1 | trifluoroacetic acid | 0.40 g | 26.9 g |
| T-2 | acetylacetone | 0.35 g | 26.9 g |
| T-3 | ethyl acetoacetate | 0.46 g | 26.8 g |
| T-4 | tetrahydroethane | 0.25 g | 27.0 g |
| T-5 | pyridine | 0.28 g | 27.0 g |

(Organic Thin Film Formation, Organic Thin Film Evaluation)

0.65 g of the metal-based surfactant M-1, 1.3 g of a titanium complex solution (T-1 to T-5), and 2.0 g of distilled water were added to 99 g samples of water-saturated toluene (water content: 460 ppm), and the resulting solutions were left to age for one day, thus yielding organic thin film forming solutions (SA-106 to SA-110). Subsequently, glass slides were immersed for 5 minutes in the thus prepared organic thin film forming solutions (SA-106 to SA-110), and these glass slides were then removed, the surfaces were washed with toluene, and the slides were dried for 10 minutes at 60° C., thereby yielding glass slides with an ODS organic thin film (SAM-106 to SAM-110) formed on the surfaces thereof.

A microsyringe was used to drip 5 µl of water or tetradecane onto the surface of sample of organic thin film-coated glass slides obtained above, and the slides were then left to stand for 60 seconds. Subsequently, the contact angle at the water and tetradecane drop surfaces was measured using a contact angle measurement device (360S, manufactured by Erma Inc.). The results are shown in Table 6. In Table 6, the units for the contact angles are degrees (°).

TABLE 6

| Organic thin film | Titanium complex solution | Organic thin film forming solution | Organic thin film contact angle (°) | |
|---|---|---|---|---|
| | | | Water | Tetradecane |
| SAM-106 | T-1 | SA-106 | 97.4 | 26.6 |
| SAM-107 | T-2 | SA-107 | 103.0 | 27.4 |
| SAM-108 | T-3 | SA-108 | 103.5 | 32.2 |
| SAM-109 | T-4 | SA-109 | 105.8 | 35.5 |
| SAM-110 | T-5 | SA-110 | 103.5 | 35.3 |

From Table 6 it is clear that by immersing glass slides for 10 minutes in the organic thin film forming solutions SA-106 to SA-110, organic thin films with excellent water repellency and oil repellency can be formed rapidly.

(25) Organic Thin Film Formation-7

(Preparation of Titanium Complex Solution)

0.51 g of an alkoxy titanium hydrolysis product (A-10, manufactured by Nippon Soda Co., Ltd.) was added to 19.2 g of hydrous toluene, and 0.25 g of acetylacetone (or 0.33 g of ethyl acetoacetate) was then added as a coordination compound, thus forming a titanium complex solution (T-6 or T-7).

(Organic Thin Film Formation, Organic Thin Film Evaluation)

0.65 g of the metal-based surfactant M-1, 1.3 g of the titanium complex solution (T-6 or T-7), and 2.0 g of distilled water were added to 99 g samples of hydrous toluene (water content: 460 ppm), and the resulting solutions were left to age for one day, thus yielding organic thin film forming solutions (SA-111 and SA-112) Subsequently, glass slides were immersed for 5 minutes in the thus prepared organic thin film forming solutions (SA-111 and SA-112), and these glass slides were then removed, the surfaces were washed with toluene, and the slides were dried for 10 minutes at 60° C., thereby yielding glass slides with an ODS organic thin film (SAM-111 and SAM-112) formed on the surfaces thereof.

A microsyringe was used to drip 5 µl of water or tetradecane onto the surface of separate organic thin film-coated glass slides obtained above, and the slides were then left to stand for 60 seconds. Subsequently, the contact angle at the water and tetradecane drop surfaces was measured using a contact angle measurement device (360 S, manufactured by Erma Inc.). The results are shown in Table 7. In Table 7, the units for the contact angles are degrees (°).

TABLE 7

| Organic thin film | Titanium complex solution | Organic thin film forming solution | Organic thin film contact angle (°) | |
|---|---|---|---|---|
| | | | Water | Tetradecane |
| SAM-111 | T-6 | SA-111 | 101.2 | 34.8 |
| SAM-112 | T-7 | SA-112 | 104.9 | 33.1 |

From Table 7 it is clear that by immersing glass slides for 10 minutes in the organic thin film forming solutions SA-111 and SA-112, organic thin films with excellent water repellency and oil repellency can be formed rapidly.

(26) Organic Thin Film Formation-8

(Preparation of Organic Thin Film Forming Solution)

To hydrous toluene with a water content of 350 ppm was added sufficient quantity of the metal-based surfactant M-1 to produce a final ODS concentration of 0.5% by weight, and the resulting mixture was stirred for 30 minutes at room temperature. To this solution was then added sufficient quantity of a 1% by weight hydrous toluene solution of tetrakis(trimethylsiloxy)titanium (T-8) (manufactured by AZmax Co., Ltd.) to produce a ratio (number of mols of ODS):(number of titanium oxide-equivalent mols within (T-8)) of 98:2, and the resulting mixture was then stirred for three hours at room temperature. A 100 g sample of the resulting reaction solution was transferred to a bottle with an internal capacity of 1000 ml, and using an 18 liters/minute blower and a Kinoshita glass ball filter, saturated water vapor was bubbled through the solution at 25° C., yielding an organic thin film forming solution (SA-113) in which the moisture content had been adjusted to 510 ppm.

(Organic Thin Film Formation, Organic Thin Film Evaluation)

Alkali-free glass substrates (product number: AN100, manufactured by Asahi Glass Co., Ltd.) and silicon wafers (Si) that had been subjected to ultrasound cleaning and ozone cleaning were immersed in the organic thin film forming solution obtained above for the immersion time periods shown in Table 8, and were then removed from the solution. The substrates were then subjected to ultrasound cleaning in toluene, and then dried at 60° C. for 10 minutes, thereby forming substrates with organic thin films formed on the surfaces thereof (SAM-113 (AN100) and SAM-114 (Si)).

Subsequently, a microsyringe was used to drip 5 µl of water or Tetradecane onto the organic thin film on the surface of each of the substrates (AN100 and Si) obtained above, and the contact angle at the organic thin film surface was measured using a contact angle measurement device (360S, manufactured by Erma Inc.). The results of the measurements are shown in Table 8.

TABLE 8

| Substrate with organic thin film formed thereon | Substrate | Immersion time (minutes) | Organic thin film contact angle (°) | |
|---|---|---|---|---|
| | | | Water | Tetradecane |
| SAM-113 | AN-100 | 3 | 104 | 34 |
| SAM-114 | Si | 5 | 105 | 33 |

In addition, the organic thin films formed on the surfaces of each of the substrates (AN100, Si) were then subjected to ultrasound cleaning for one hour in water, and the contact angles were then remeasured. For both substrates (AN100, Si), no reduction in the contact angle was observed as a result of the ultrasound cleaning, confirming that in both cases, an organic thin film with excellent adhesiveness had been formed on the substrate surface.

(27) Organic Thin Film Formation-9

(Preparation of Organic Thin Film Forming Solution)

To hydrous toluene with a water content of 350 ppm was added sufficient quantity of the metal-based surfactant M-1 to produce a final ODS concentration of 0.5% by weight, and the resulting mixture was stirred for 30 minutes at room temperature. To this solution was then added sufficient quantity of a 1% by weight hydrous toluene solution of benzoic acid (T-9) to produce a ratio (number of mols of ODS):(number of mols of benzoic acid within (T-9)) of 10:1, the resulting mixture was stirred at room temperature, a 100 g sample of the reaction solution was transferred to a bottle with an internal capacity of 1000 ml, and using an 18 liters/minute blower and a Kinoshita glass ball filter, saturated water vapor was bubbled through the solution at 25° C., yielding an organic thin film forming solution (SA-114) in which the moisture content had been adjusted to 452 ppm.

With the exception of using either a 1% by weight hydrous toluene solution of capric acid (T-10) or a 1% by weight hydrous toluene solution of acetic acid (T-11) instead of the benzoic acid, the organic thin film forming solutions (SA-115 and SA-116) in which the moisture content had been adjusted to 317 ppm and 434 ppm respectively were prepared in the same manner as described above.

(Organic Thin Film Formation, Organic Thin Film Evaluation)

Soda lime glass substrates (S-1126, manufactured by Matsunami Glass Ind., Ltd.) that had been subjected to ultrasound cleaning and ozone cleaning were immersed in each of the organic thin film forming solutions (SA-114 to SA-116) obtained above for 30 minutes, and were then removed from the solution. The substrate surfaces were then subjected to ultrasound cleaning in toluene, and then dried at 60° C. for 10 minutes, thereby forming substrates with organic thin films formed on the surfaces thereof.

A microsyringe was used to drip 5 µl of water or tetradecane onto the surface of each of the substrates, and the substrates were then left to stand for 60 seconds. Subsequently, the contact angle at the water and tetradecane drop surface was measured using a contact angle measurement device (360S, manufactured by Erma Inc.). The results are shown in Table 9. In Table 9, pKa refers to the value obtained by measuring the acid dissociation constant for an aqueous solution of the organic acid used. In Table 9, the units for the contact angles are degrees (°).

TABLE 9

| Organic thin film forming solution | Organic acid solution Type | pKa | Organic thin film contact angle (°) Water | Tetradecane |
|---|---|---|---|---|
| SA-114 | Benzoic acid (T-9) | 4.20 | 104.6 | 32.1 |
| SA-115 | Capric acid (T-10) | 4.89 | 114.4 | 25.3 |
| SA-116 | Acetic acid (T-11) | 4.56 | 83.8 | 19.6 |

From Table 9 it is clear that when an organic acid with a pKa of 1 to 6, and preferably from 2 to 5, is used, no reduction in the contact angle is observed as a result of the ultrasound cleaning, confirming that for both substrates, an organic thin film with excellent adhesiveness is formed on the substrate surface.

(28) Organic Thin Film Formation-10

In a clean room under conditions including a temperature of 25° C. and a humidity of either 30% RH or 80% RH, an ozone-cleaned, rectangular, alkali-free glass substrate of dimensions 2 cm×5 cm was immersed in 100 g of the solution SA-2 (water content: 480 ppm), and this immersion process was repeated consecutively for 7 substrates, with an interval of 10 minutes between immersion repetitions. For each repetition, the substrate was immersed for 3 minutes, removed from the solution, subjected to ultrasound cleaning in toluene, and then dried at 60° C. for 10 minutes, thereby forming an organic thin film. The results are summarized in Table 10.

TABLE 10

| | Organic thin film contact angle: water (°) | |
|---|---|---|
| Immersion repetition | Humidity 30% RH | Humidity 80% RH |
| 1st repetition | 104 | 105 |
| 4th repetition | 86 | 104 |
| 7th repetition | 77 | 105 |
| Water content at completion | 180 ppm | 600 ppm |

From Table 10 it is clear that in the environment at a humidity of 80% RH, thin films with a large contact angle of 100° or higher were able to be produced with good reproducibility with short immersion times. In contrast, in the environment at a humidity of 30% RH, the contact angle fell as the number of repetitions increased. From this finding it is clear that in a low humidity environment, the water content of the organic thin film forming solution decreases during the immersion process, making it impossible to form dense monomolecular films.

(29) Monomolecular Film Formation (Preparation of Monomolecular Film Forming Solution)

A monomolecular film forming solution was prepared using the catalyst solution and the metal-based surfactant described below.

The catalyst solution (C-2) prepared above in (2) Catalyst Preparation-2. n-octadecyltrimethoxysilane (ODS: manufactured by Gelest Inc., referred to as metal-based surfactant M-1) as disclosed above in (8) Metal-based Surfactant-1.

Using the same method as that described above in (11) Organic Thin Film Forming Solution Preparation Method-2, the metal-based surfactant M-1 was added to hydrous toluene with a water content of 350 ppm in sufficient quantity to yield a final concentration of 0.5% by weight, and the mixture was then stirred at room temperature for 30 minutes. Subsequently, the catalyst C-2 was added dropwise to the solution in the predetermined quantity shown in Table 11, and following completion of the dropwise addition, the mixture was stirred at room temperature for three hours. A 100 g sample of the thus formed solution was transferred to a bottle, a glass fiber filter paper of diameter 3 cm (GA-100, manufactured by Toyo Roshi Co., Ltd.) that had been thoroughly wet with water was immersed at the bottom of the bottle, and the bottle was sealed. The bottle was then allowed to stand at room temperature for two hours, yielding a monomolecular film forming solution (SA-201). The water content was 550 ppm. The results are summarized in Table 11. In Table 11, the water content prior to treatment represents the water content prior to adjustment of the water content of the monomolecular film forming solution.

The water content was measured using a Karl Fischer moisture meter (CA-07, manufactured by Dia Instruments Co., Ltd.) using a coulometric titration method.

TABLE 11

| Monomolecular film forming solution | Catalyst (C) | Mixing ratio* of M-1 and C | Water content prior to treatment | Water content of monomolecular film forming solution |
|---|---|---|---|---|
| SA-201 | C-2 | 90:10 | 350 | 550 |

*The ratio of (number of mols of M-1):(metal oxide-equivalent number of mols of metal component within C solution)

(Monomolecular Film Production Method-1)

A soda lime glass substrate (SLG), an alkali-free glass substrate (AN100, manufactured by Asahi Glass Co., Ltd.), and a silicon wafer (Si) that had been subjected to ultrasound cleaning and ozone cleaning were each sprayed with the monomolecular film forming solution (SA-201), using a low-pressure spray gun, until the entire substrate surface was wet. After a 10-second pause, the entire substrate surface was once again sprayed with the solution SA-201. During the first spray application, the SA-201 solution exhibited favorable wetting characteristics across the entire substrate surface. During the second spray application, the substrate surface appeared to repel the solution SA-201. Following confirmation of this repellency, neat toluene solvent was sprayed from the same spray gun to wash the substrate surface. Subsequently, each of the substrates was dried at 60° C. for 10 minutes, yielding a monomolecular film (SAM-201 to 203).

(Monomolecular Film Production Method-2)

The monomolecular film forming solution (SA-201) prepared using the method described above in (29) Monomolecular film formation-1 was dripped onto a soda lime glass substrate (SLG), an alkali-free glass substrate (AN100, manufactured by Asahi Glass Co., Ltd.), and a silicon wafer (Si) that had been subjected to ultrasound cleaning and ozone cleaning, a polyester film was overlaid on top of each sample, and a rubber roller was then rolled over the film surface, thereby spreading the monomolecular film forming solution (SA-201) uniformly and thinly between the substrate and the film. After being allowed to stand in this state for a predetermined period, the film was peeled off each sample, and the substrates were subjected to ultrasound cleaning in toluene and then dried at 60° C. for 10 minutes, thus yielding monomolecular films (SAM-204 to 206).

(Monomolecular Film Evaluation)

Evaluation results (contact angle, film adhesiveness, XPS analysis) for the monomolecular films, which were measured using the methods described above in (19) Evaluation of organic thin films, are summarized in Table 12.

From Table 12 it is clear that in the production method-1 and the production method-2, monomolecular films with favorable water repellency, oil repellency, and adhesiveness are being obtained within short time periods. Conventionally, it was thought that metal-based surfactants having hydrolyzable groups such as alkoxy groups and the like could only be used to form monomolecular films by using dipping methods, but by employing the method of the present invention, the formation of a monomolecular film on a large substrate using a small quantity of solution is now possible. Confirmation of the production of monomolecular films was made by XPS analysis.

INDUSTRIAL APPLICABILITY

By using a method for producing an organic thin film according to the present invention, a dense self-assembly monomolecular film with minimal impurities can be produced. Furthermore, a highly crystalline, monomolecular, and homogenous chemically adsorbed film with excellent adhesiveness can be formed even on an amorphous substrate.

A chemically adsorbed film of the present invention can be used in the formation of design patterns for electronic devices and the like, and can also be extremely readily applied to devices requiring heat resistant, weather resistant, and abrasion resistant ultra-thin coatings, including electronic products, and particularly electronic appliances, vehicles, industrial equipment, mirrors, and optical lenses and the like, and as such, can be said to have a very high industrial value.

The invention claimed is:

1. A method for producing an organic thin film in which an organic thin film is formed on a surface of a substrate, comprising a step (A) of bringing said substrate into contact with an organic solvent solution comprising a metal-based surfactant having at least one hydrolyzable group, and a catalyst, wherein the water content within said organic solvent solution is either set to or maintained within a range of from 50 ppm to the saturated water content for the organic solvent, and said catalyst is at least one material selected from the group consisting of metal oxides; metal hydroxides; metal alkoxides; chelated metal compounds; coordinated metal compounds; partial hydrolysis products of metal alkoxides; hydrolysis products obtained by treating a metal alkoxide with no less than a two-fold equivalence of water; and silanol condensation catalysts.

2. A method for producing an organic thin film according to claim 1, wherein said organic solvent solution is prepared by using from 0.001 to 1 mol, or an oxide-equivalent quantity of 0.001 to 1 mol, of said catalyst, per 1 mol of said metal-based surfactant.

TABLE 12

| Monomolecular film | Monomolecular film production | | | Film properties | | |
|---|---|---|---|---|---|---|
| | Film production method | Substrate | Stand time (minutes) | Film contact angle (°) | | Adhesiveness |
| | | | | Water | Toluene | |
| SAM-201 | Production method-1 | SLG | — | 105 | 35 | ○ |
| SAM-202 | " | AN100 | — | 106 | 36 | ○ |
| SAM-203 | " | Si | — | 102 | 30 | ○ |
| SAM-204 | Production method-2 | SLG | 1 | 106 | 36 | ○ |
| SAM-205 | " | AN100 | 2 | 104 | 34 | ○ |
| SAM-206 | " | Si | 5 | 105 | 32 | ○ |

3. A method for producing an organic thin film according to claim 1, wherein said water content within said organic solvent solution is maintained within a range of from 50 ppm to the saturated water content for the organic solvent, and said step (A) is repeated at least two times using the same solution.

4. A method for producing an organic thin film according to claim 3, wherein said metal-based surfactant having at least one hydrolyzable group is a compound represented by a formula (I) shown below:

$$R^1_n MX_{m-n} \quad (I)$$

(wherein, $R^1$ represents a hydrocarbon group that may contain a substituent, a halogenated hydrocarbon group that may contain a substituent, a hydrocarbon group containing a linkage group, or a halogenated hydrocarbon group containing a linkage group, M represents at least one metal atom selected from a group consisting of a silicon atom, germanium atom, tin atom, titanium atom, and zirconium atom, X represents a hydroxyl group or a hydrolyzable group, n represents an integer from 1 to (m−1), m represents an atomic valence of said metal M, and in those cases where n is 2 or greater, said $R^1$ groups are either identical or different, and in those cases where (m−n) is 2 or greater, said X groups are either identical or different, although of (m−n) X groups, at least one X group is a hydrolyzable group).

5. A method for producing an organic thin film according to claim 3, wherein said step of bringing said substrate into contact with said organic solvent solution is conducted within a space that is maintained at a humidity of at least 40% RH.

6. A method for producing an organic thin film according to claim 3, wherein said step of bringing said substrate into contact with said organic solvent solution is conducted within a space that is maintained at a humidity of at least 60% RH.

7. A method for producing an organic thin film according to claim 3, wherein said organic solvent solution is a hydrocarbon-based solvent solution or a fluorinated hydrocarbon-based solvent solution.

8. A method for producing an organic thin film according to claim 3, wherein said organic thin film is a crystalline organic thin film.

9. A method for producing an organic thin film according to claim 3, wherein said organic thin film is a monomolecular film.

10. A method for producing an organic thin film according to claim 3, wherein in repeating said step (A) two or more times, said step (A) is conducted with two or more substrates being brought into contact with the same solution.

11. A method for producing an organic thin film according to claim 1, wherein said metal-based surfactant having at least one hydrolyzable group is a compound represented by a formula (I) shown below:

$$R^1_n MX_{m-n} \quad (I)$$

(wherein, $R^1$ represents a hydrocarbon group that may contain a substituent, a halogenated hydrocarbon group that may contain a substituent, a hydrocarbon group containing a linkage group, or a halogenated hydrocarbon group containing a linkage group, M represents at least one metal atom selected from a group consisting of a silicon atom, germanium atom, tin atom, titanium atom, and zirconium atom, X represents a hydroxyl group or a hydrolyzable group, n represents an integer from 1 to (m−1), m represents an atomic valence of said metal M, and in those cases where n is 2 or greater, said $R^1$ groups are either identical or different, and in those cases where (m−n) is 2 or greater, said X groups are either identical or different, although of (m−n) X groups, at least one X group is a hydrolyzable group).

12. A method for producing an organic thin film according to claim 1, wherein said step of bringing said substrate into contact with said organic solvent solution is conducted within a space that is maintained at a humidity of at least 40% RH.

13. A method for producing an organic thin film according to claim 1, wherein said step of bringing said substrate into contact with said organic solvent solution is conducted within a space that is maintained at a humidity of at least 60% RH.

14. A method for producing an organic thin film according to claim 1, wherein said organic solvent solution is a hydrocarbon-based solvent solution or a fluorinated hydrocarbon-based solvent solution.

15. A method for producing an organic thin film according to claim 1, wherein said organic thin film is a crystalline organic thin film.

16. A method for producing an organic thin film according to claim 1, wherein said organic thin film is a monomolecular film.

17. A method for producing an organic thin film in which an organic thin film is formed on a surface of a substrate, comprising a step (A) of bringing said substrate into contact with an organic solvent solution comprising a metal-based surfactant having at least one hydrolyzable group, and a catalyst, wherein the water content within said organic solvent solution is either set to or maintained within a range from 50 to 1,000 ppm, and said catalyst is at least one material selected from the group consisting of metal oxides; metal hydroxides; metal alkoxides; chelated metal compounds; coordinated metal compounds; partial hydrolysis products of metal alkoxides; hydrolysis products obtained by treating a metal alkoxide with no less than a two-fold equivalence of water; and silanol condensation catalysts.

18. A method for producing an organic thin film in which an organic thin film is formed on a surface of a substrate, comprising a step (A) of bringing said substrate into contact with an organic solvent solution comprising a metal-based surfactant having at least one hydrolyzable group, and a catalyst, wherein the water content within said organic solvent solution is maintained within a range from 50 to 1,000 ppm, and said step (A) is repeated at least two times using the same solution, and said catalyst is at least one material selected from the group consisting of metal oxides; metal hydroxides; metal alkoxides; chelated metal compounds; coordinated metal compounds; partial hydrolysis products of metal alkoxides; hydrolysis products obtained by treating a metal alkoxide with no less than a two-fold equivalence of water; and silanol condensation catalysts.

* * * * *